(12) United States Patent
Ma et al.

(10) Patent No.: US 12,149,681 B2
(45) Date of Patent: Nov. 19, 2024

(54) INTER PREDICTION METHOD AND ENCODER

(71) Applicant: GUANGDONG OPPO MOBILE TELECOMMUNICATIONS CORP., LTD., Guangdong (CN)

(72) Inventors: Yanzhuo Ma, Dongguan (CN); Junyan Huo, Dongguan (CN); Shuai Wan, Dongguan (CN); Fuzheng Yang, Dongguan (CN); Qihong Ran, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 29 days.

(21) Appl. No.: 17/953,250

(22) Filed: Sep. 26, 2022

(65) Prior Publication Data

US 2023/0052940 A1    Feb. 16, 2023

Related U.S. Application Data

(63) Continuation of application No. PCT/CN2021/076727, filed on Feb. 18, 2021.

(30) Foreign Application Priority Data

Apr. 8, 2020    (CN) .......................... 202010270775.6

(51) Int. Cl.
*H04N 19/105*    (2014.01)
*H04N 19/119*    (2014.01)
*H04N 19/61*    (2014.01)

(52) U.S. Cl.
CPC ......... *H04N 19/105* (2014.11); *H04N 19/119* (2014.11); *H04N 19/61* (2014.11)

(58) Field of Classification Search
CPC .... H04N 19/105; H04N 19/119; H04N 19/52; H04N 19/573; H04N 19/61; H04N 19/70
(Continued)

(56) References Cited

U.S. PATENT DOCUMENTS

2021/0160520 A1* 5/2021 Chen ...................... H04N 19/14
2021/0195200 A1* 6/2021 Chen .................... H04N 19/119
(Continued)

FOREIGN PATENT DOCUMENTS

CN    102611880 A    7/2012
WO    2019246535 A1    12/2019

OTHER PUBLICATIONS

Hsiao et al., "CE4-related: Simplification on geometric partitioning mode by replacing motion index calculation with subsampled weight information", 2020, JVET-Q0188-v1, pp. 1-4 (Year: 2020).*
(Continued)

*Primary Examiner* — Kathleen M Walsh
(74) *Attorney, Agent, or Firm* — Ladas & Parry, LLP

(57) ABSTRACT

The inter prediction method comprises: determining a prediction mode parameter of a current block; determining a GPM parameter of the current block in response to that the prediction mode parameter indicates that a GPM is used to determine inter prediction of the current block; determining a first prediction value of a first partition of the current block and a second prediction value of a second partition of the current block; determining a weight index of a sample in the current block based on the GPM parameter of the current block; determining a first weight value and a second weight value of the sample in the current block based on the weight index of the sample in the current block; performing weighted combination of the first prediction value and the second prediction value to obtain the inter prediction of the current block.

18 Claims, 12 Drawing Sheets

(58) Field of Classification Search
USPC .................................................. 375/240.12
See application file for complete search history.

(56) References Cited

U.S. PATENT DOCUMENTS

2022/0191504 A1*  6/2022  Gao ..................... H04N 19/543
2022/0303533 A1*  9/2022  Deng ................... H04N 19/119

OTHER PUBLICATIONS

Benjamin Bross et al. "Versatile Video Coding (Draft 8)"Joint Video Experts Team (JVET) of ITU-T SG 16 WP 3 and ISO/IEC JTC 1/SC 29/WG 11 17th Meeting: Brussels, BE, Jan. 7-17, 2020 JVET-Q2001-vE, Mar. 12, 2020 (Mar. 12, 2020), all pages.

Yucheng Sun et al. "CE4-related: On simplification for GEO weight derivation"Joint Video Experts Team (JVET) of ITU-T SG 16 WP 3 and ISO/IEC JTC 1/SC 29/WG 11 17th Meeting: Brussels, BE, Jan. 7-17, 2020 JVET-Q0312-v3, Jan. 10, 2020 (Jan. 10, 2020), all pages.

Yu-Ling Hsiao et al. "CE4-related: Simplification on geometric partitioning mode by replacing motion index calculation with subsampled weight information"Joint Video Experts Team (JVET) of ITU-T SG 16 WP 3 and ISO/IEC JTC 1/ SC 29/WG 11 17th Meeting: Brussels, BE, Jan. 7-17, 2020 JVET-Q0188-v1, Jan. 7, 2020 (Jan. 7, 2020), all pages.

International Search Report (ISR) dated May 14, 2021 for application No. PCT/CN2021/076727, and its English translation provided by WIPO.

Written Opinion (WOSA) dated May 14, 2021 for application No. PCT/CN2021/076727, and its English translation provided by WIPO.

Y-Z Ma et al: "Simplified disLut for GPM", 130. MPEG Meeting; Apr. 20, 2020-Apr. 24, 2020; Alpbach; (Motion Picture Expert Group or ISO/IEC JTC1/SC29/WG11), No. m53448; JVET-R0366, Apr. 17, 2020 (Apr. 17, 2020), XP030286969, abstract, section 3.

Esenlik (Huawei) S et al: "Non-CE4: Geometrical partitioning for inter blocks", 15. JVET Meeting; Jul. 3, 2019-Jul. 12, 2019; Gothenburg; (The Joint Video Exploration Team of ISO/IEC JTC1/SC29/WG11 and ITU-T SG.16), No. JVET-O0489-v4; JVET-O0489 ; m48614, Jul. 7, 2019 (Jul. 7, 2019), pp. 1-9, XP030219723, abstract, section 2.

Benjamin Bross et al: "Versatile Video Coding (Draft 5)", Joint Video Experts Team (JVET) of ITU-T SG 16 WP 3 and ISO/IEC JTC 1/SC 29/WG 11, JVET-N1001-v5, 14th Meeting: Geneva, CH, Mar. 19-27, 2019, section 8.5.7.

Supplementary European Search Report in the corresponding European application No. 21785246.6, mailed on Aug. 11, 2023.

First Office Action of the Taiwanese application No. 110109405, issued on Aug. 21, 2024.

* cited by examiner merge candidate list a. Luma weight matrix of the current block

FIG. 12A b. Chroma weight matrix of
the current block

FIG. 12B

INTER PREDICTION METHOD AND ENCODER

CROSS-REFERENCE TO RELATED APPLICATIONS

This is a continuation of International Application No. PCT/CN2021/076727 filed on Feb. 18, 2021, which claims priority to Chinese Patent Application No. 202010270775.6, filed on Apr. 8, 2020. The disclosure of the above applications is hereby incorporated by reference in its entirety.

BACKGROUND

In video coding/decoding, an inter prediction mode, in addition to intra prediction, may be used in coding/decoding of a current block. Inter prediction may include motion estimation and motion compensation. During the development of Versatile Video Coding (VVC), division of other shapes except squares and rectangles is introduced for motion compensation. First, a Triangular Partition Mode (TPM) is introduced in which triangular prediction units are obtained by taking a diagonal or back-diagonal of a square or rectangle as a partitioning line, thereby representing inter prediction data more flexibly, reducing prediction errors, and further improving the coding efficiency.

In the Joint Video Experts Team (JVET) meeting, a more flexible inter Geometrical Partition Mode (GPM) than the TPM was introduced. In an inter prediction process of the GPM, an angle mapping table is needed for calculation of weight index values of samples. All angle mapping values in the angle mapping table are even, so the weight index values of all the samples are even. That is, last bits of the weight index values of all the samples are always 0. In such case, there is an unnecessary bit overhead. Therefore, the data storage overhead during inter prediction is relatively high, and texts and codes are relatively complex.

SUMMARY

In a first aspect, the embodiments of the disclosure provide an inter prediction method, which may be applied to an encoder and include the following operations.

A prediction mode parameter of a current block is determined.

A GPM parameter of the current block is determined in response to that the prediction mode parameter indicates that a GPM is used to determine an inter prediction value of the current block.

A first prediction value of a first partition of the current block and a second prediction value of a second partition of the current block are determined based on the GPM parameter of the current block.

A weight index of a sample in the current block is determined based on the GPM parameter of the current block. Weight indexes of the samples determined based on different GPM parameters are not all even numbers.

A first weight value and second weight value of the sample in the current block are determined based on the weight index of the sample in the current block.

Based on a first prediction value and first weight value of a sample in the first partition and a second prediction value and second weight value of a sample in the second partition, weighted merging is performed on the first prediction values and the second prediction values to obtain the inter prediction value of the current block.

In a second aspect, the embodiments of the disclosure provide an inter prediction method, which may be applied to a decoder and include the following operations.

A bitstream is parsed to determine a prediction mode parameter of a current block.

A GPM parameter of the current block is determined in response to that the prediction mode parameter indicates that a GPM is used to determine an inter prediction value of the current block.

A first prediction value of a first partition of the current block and a second prediction value of a second partition of the current block are determined based on the GPM parameter of the current block.

A weight index of a sample in the current block is determined based on the GPM parameter of the current block. Weight indexes of the samples determined based on different GPM parameters are not all even numbers.

A first weight value and second weight value of the sample in the current block are determined based on the weight index of the sample in the current block.

Based on the first prediction value and first weight value of a sample in the first partition and the second prediction value and second weight value of a sample in the second partition, weighted merging is performed on the first prediction values and the second prediction values to obtain the inter prediction value of the current block.

In a fifth aspect, the embodiments of the disclosure also provide an encoder, which may include a first memory and a first processor. The first memory may store a computer program capable of running in the first processor. The first processor may execute the program to implement the inter prediction method at an encoder.

BRIEF DESCRIPTION OF THE DRAWINGS

FIG. 12A is an exemplary schematic diagram of weight values of luma according to an embodiment of the disclosure.

FIG. 12B is an exemplary schematic diagram of weight values of chroma according to an embodiment of the disclosure.

DETAILED DESCRIPTION

In order to make the characteristics and technical contents of the embodiments of the disclosure understood in more detail, the implementation of the embodiments of the disclosure will be described below in combination with the drawings in detail. The appended drawings are only for description as references and not intended to limit the embodiments of the disclosure.

Figure 1:
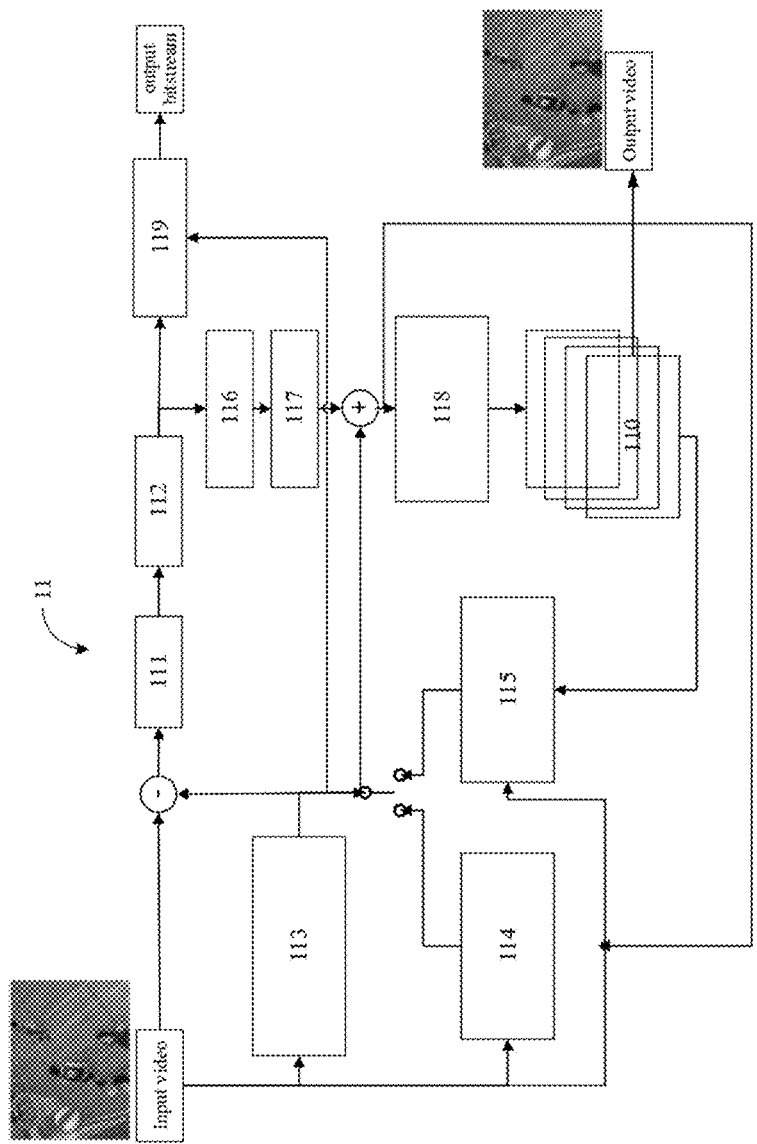
FIG. 1 is a schematic composition block diagram of a video coding system according to an embodiment of the disclosure.

The present disclosure provides a video coding system. As shown in FIG. 1, the video coding system 11 includes a transform unit 111, a quantization unit 112, a mode selection and coding control logic unit 113, an intra prediction unit 114, an inter prediction unit 115 (including motion compensation and motion estimation), an inverse quantization unit 116, an inverse transform unit 117, an in-loop filter unit 118, a coding unit 119, and a decoded picture buffer unit 110. For an input original video signal, a video reconstruction block may be obtained by division of a Coding Tree Unit (CTU). A coding mode is determined by the mode selection and coding control logic unit 113. Then, residual sample information obtained by intra or inter prediction is processed by the transform unit 111 and the quantization unit 112 to transform the video reconstructed block, including transforming the residual information from a sample domain to a transformation domain and quantizing an obtained transformation coefficient to further reduce a bit rate. The intra prediction unit 114 is configured to perform intra prediction on the video reconstructed block. The intra prediction unit 114 is configured to determine an optimal intra prediction mode (i.e., target prediction mode) for the video reconstructed block. The inter prediction unit 115 is configured to perform inter prediction coding on the received video reconstructed block relative to one or more blocks in one or more reference frames to provide time prediction information. Motion estimation is a process of generating a motion vector (MV), and a motion of the video reconstructed block may be estimated according to the MV. Then, motion compensation is performed based on the MV determined by motion estimation. After an inter prediction mode is determined, the inter prediction unit 115 is further configured to provide selected inter predicted data for the coding unit 119, and send MV data determined by calculation to the coding unit 119. In addition, the inverse quantization unit 116 and the inverse transform unit 117 are configured to reconstruct the video reconstructed block, namely a residual block is reconstructed in the sample domain. An artifact with a blocking effect in the reconstructed residual block is removed through the in-loop filter unit 118, and then the reconstructed residual block is added to a predictive block in a frame of the decoded picture buffer 110 to generate a reconstructed video reconstructed block. The coding unit 119 is configured to code various coding parameters and quantized transformation coefficients. The decoded picture buffer 110 is configured to store the reconstructed video reconstructed block as a prediction reference. As video pictures are coded, new reconstructed video reconstructed blocks may be continuously generated, and all these reconstructed video reconstructed blocks may be stored in the decoded picture buffer 110.

Figure 2:
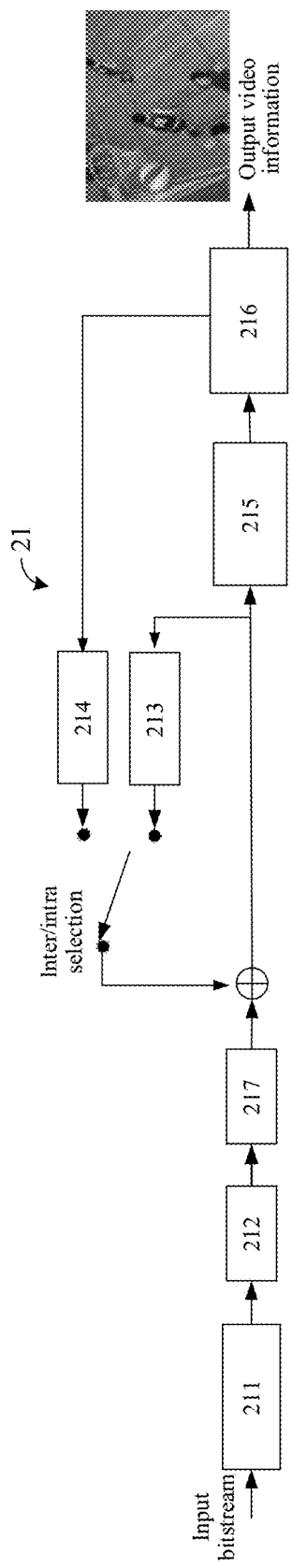
FIG. 2 is a schematic composition block diagram of a video decoding system according to an embodiment of the disclosure.

The embodiments of the disclosure provide a video decoding system. FIG. 2 is a composition structure diagram of a video decoding system according to an embodiment of the disclosure. As shown in FIG. 2, the video decoding system 21 includes a decoding unit 211, an inverse transform 217, an inverse quantization unit 212, an intra prediction unit 213, a motion compensation unit 214, an in-loop filter unit 215, and a decoded picture buffer unit 216. After an input video signal is coded by the video coding system 11, a bitstream of the video signal is output. The bitstream is input to the video decoding system 21, and is processed by the decoding unit 211 first to obtain a decoded transform coefficient. The transform coefficient is processed by the inverse transform unit 217 and the inverse quantization unit 212 to generate a residual block in a sample domain. The intra prediction unit 213 may be configured to generate predicted data of a current video decoding block based on a determined intra prediction direction and data of a previous decoded block from a current frame or picture. The motion compensation unit 214 analyzes an MV and another associated syntactic element to determine prediction information for the video decoding block, and generates a predictive block of the presently decoded video decoding block by use of the prediction information. The residual block from the inverse transform unit 217 and the inverse quantization unit 212 and the corresponding predictive block generated by the intra prediction unit 213 or the motion compensation unit 214 are summed to form a decoded video block. An artifact with a blocking effect in the decoded video signal may be removed through the in-loop filter unit 215 to improve the video quality. Then, the decoded video block is stored in the decoded picture buffer unit 216. The decoded picture buffer unit 216 stores a reference image for subsequent intra prediction or motion compensation, and is also configured to output a video signal, so as to obtain the recovered original video signal.

An inter prediction method provided in the embodiments of the disclosure is mainly applied to the inter prediction unit 115 of the video coding system 11 and an inter prediction unit, i.e., the motion compensation unit 214, of the video decoding system 21. That is, if the video coding system 11 may achieve a good prediction effect by the inter prediction method provided in the embodiments of the disclosure, the system at the decoding side may correspondingly improve the video decoding recovery quality.

Based on this, the technical solutions of the disclosure will further be described below in detail in combination with the drawings and the embodiments. Before detailed description, it is to be noted that "first", "second", "third", etc., mentioned throughout the specification are only for distinguishing different features and do not limit priorities, sequences, magnitude relationships, etc.

The embodiments of the disclosure provide an inter prediction method, which is applied to a video coding device, i.e., an encoder. Functions realized in the method may be realized by a processor in the video coding device calling a program code. Certainly, the program code may be stored in a computer storage medium. It can be seen that the video coding device at least includes the processor and the storage medium.

Figure 3:
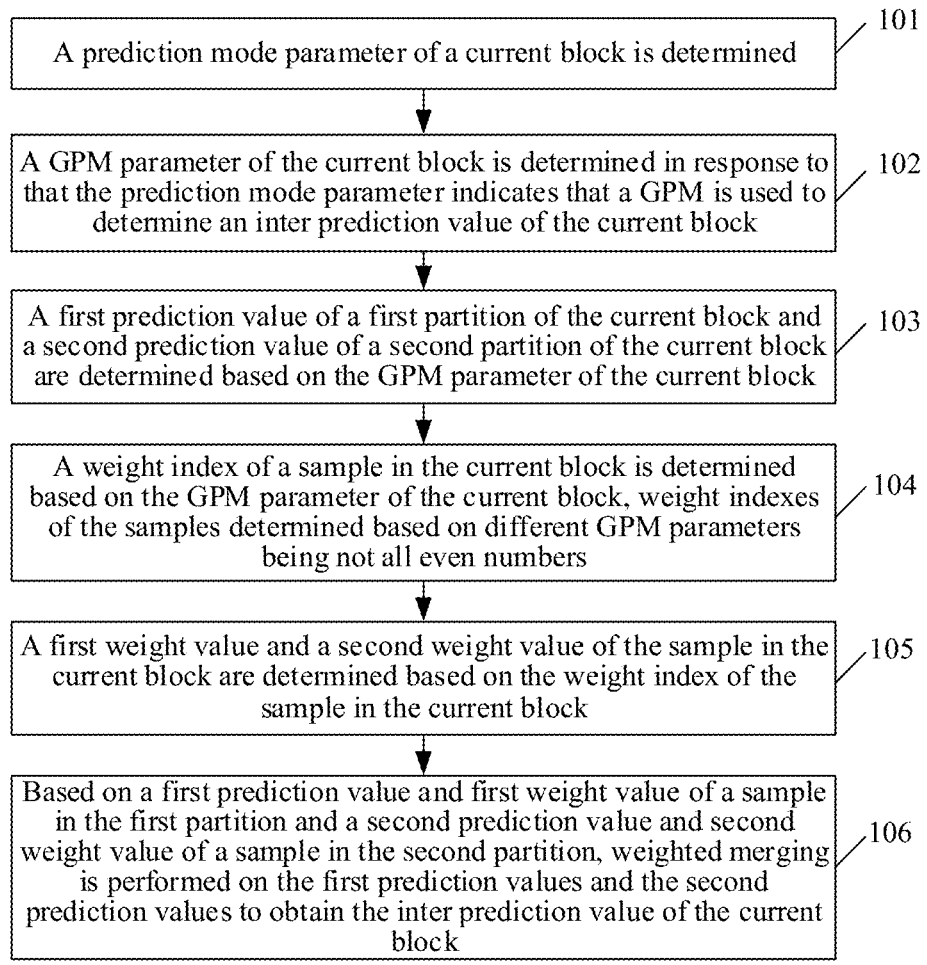
FIG. 3 is a first schematic flowchart of an intra prediction method according to an embodiment of the disclosure.

FIG. 3 is a first schematic flowchart of an inter prediction method according to an embodiment of the disclosure. The method is applied to an encoder. As shown in FIG. 3, the method includes the following operations.

In 101, a prediction mode parameter of a current block is determined.

It is to be noted that the prediction mode parameter indicates a coding mode for the current block and one or more parameters related to the mode. The prediction mode parameter of the current block may usually be determined by Rate Distortion Optimization (RDO).

Specifically, in some embodiments, the operation that the encoder determines the prediction mode parameter of the current block is implemented by the following operations. The encoder determines a colour component to be predicted of the current block. Predictive coding is performed on the colour component to be predicted by use of multiple prediction modes respectively based on a parameter of the current block, and a rate distortion cost result corresponding to each of the multiple prediction modes is calculated. The minimum rate distortion cost result is selected from the calculated multiple rate distortion cost results, and the prediction mode corresponding to the minimum rate distortion cost result is determined as the prediction mode parameter of the current block.

That is, at the encoder side, for the current block, a colour component to be predicted may be coded by use of multiple prediction modes respectively. Here, the multiple prediction modes usually include an inter prediction mode, a conventional intra prediction mode, and an unconventional intra prediction mode. The conventional intra prediction mode may further include a Direct Current (DC) mode, a planar mode, an angular mode, etc. The unconventional intra prediction mode may further include a Matrix-based Intra Prediction (MIP) mode, a Cross-Component Linear Model Prediction (CCLM) mode, an Intra Block Copy (IBC) mode, a Palette (PLT) mode, etc. The inter prediction mode may include a GPM, a TPM, etc.

Therefore, after the current block is coded by use of the multiple prediction modes, a rate distortion cost result corresponding to each prediction mode may be obtained. Then, the minimum rate distortion cost result is selected from the obtained multiple rate distortion cost results, and the prediction mode corresponding to the minimum rate distortion cost result is determined as the prediction mode parameter of the current block. As such, the current block may finally be coded by use of the determined prediction mode. In this prediction mode, the prediction residual is small, and the coding efficiency may be improved.

In 102, a GPM parameter of the current block is determined in response to that the prediction mode parameter indicates that a GPM is used to determine an inter prediction value of the current block.

In the embodiment of the disclosure, the GPM parameter of the current block may be acquired or determined when the prediction mode parameter indicates that the GPM is used to determine an inter prediction value of the current block.

In the embodiment of the disclosure, the GPM parameter of the current block includes angle index information of a partitioning line of the current block and size information of the current block, and may further include stride index information of the partitioning line of the current block, etc.

Under normal conditions, a picture of a video sequence is divided into picture blocks for coding. In a hybrid video coding framework, a coding technology, such as prediction, transform, and quantization, is usually implemented only by taking a square or rectangular block as a unit. However, in practice, an edge of a moving object is not necessarily horizontal or vertical, and even if it is, does not necessarily happen to be on a block edge that may be partitioned. Since Motion Vectors (MVs) of two sides of a moving edge are often different, performing motion prediction and compensation with a whole block during coding easily generates a relatively large prediction error, further restricting the coding efficiency.

Figure 4A:
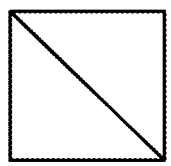
FIG. 4A is a schematic partition diagram of a TPM.
Figure 4B:
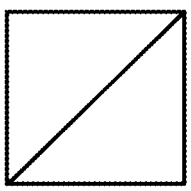
FIG. 4B is another schematic partition diagram of a TPM.
Figure 5A:
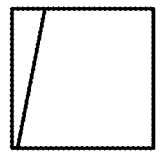
FIG. 5A is a schematic partition diagram of a GPM.
Figure 5B:
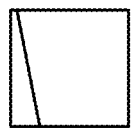
FIG. 5B is a schematic partition diagram of a GPM.
Figure 5C:
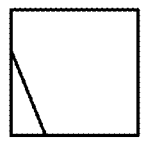
FIG. 5C is a schematic partition diagram of a GPM.
Figure 5D:
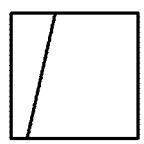
FIG. 5D is a schematic partition diagram of a GPM.
Figure 5E:
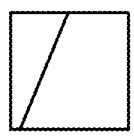
FIG. 5E is a schematic partition diagram of a GPM.
Figure 5F:
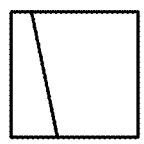
FIG. 5F is a schematic partition diagram of a GPM.
Figure 5G:
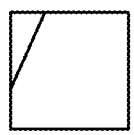
FIG. 5G is a schematic partition diagram of a GPM.

During the development of VVC, a TPM is introduced in which triangular prediction units are obtained by taking a diagonal or back-diagonal of a square or rectangle as a partitioning line, as shown in FIGS. 4A to 4B, thereby representing inter prediction data more flexibly, reducing prediction errors, and further improving the coding efficiency.

More flexible inter Geometrical partitioning for inter blocks (GEO) than the TPM was proposed at the 15th meeting of the JVET. After discussions in two meetings, JVET formally introduced GEO into the standard of VVC and renamed it GPM. In the GPM, for an edge of an object in a picture, the current block is divided into two non-rectangular sub partitions for prediction respectively, and then weighted merging is performed. For example, the non-rectangular form may be as shown in FIGS. 5A to 5G.

In current VVC Draft8, the GPM includes totally 64 partition modes, each of which corresponds to an angle $\alpha$ and a stride $\rho$. There are totally 20 angles and 4 strides.

Figure 6:
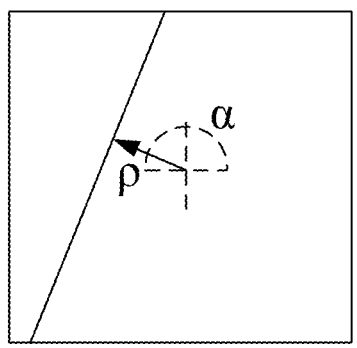
FIG. 6 is a schematic diagram of an exemplary angle and stride of a current block according to an embodiment of the disclosure.

Exemplarily, as shown in FIG. 6, each combination of an angle and a stride forms a partition mode. In the GPM, the current block is divided into two non-rectangular sub partitions, unidirectional motion compensation is performed on each sub partition separately to obtain a unidirectional prediction value, and weighted merging is finally performed on the unidirectional prediction values of the two sub partitions by use of a weight matrix to obtain a final GPM prediction value.

In the embodiments of the disclosure, when it is determined at the encoder side that the GPM is used for inter prediction, the encoder may acquire the GPM parameter for inter prediction of the current block in the GPM. Specifically, the GPM parameter includes a partition mode for the current block, index information of MV information of a first partition, and index information of MV information of a second partition.

It is to be noted that, in VTM8.0, a Coding Unit (CU) corresponding to each current block needs to satisfy some limitations for use of the GPM. Exemplarily, the following limitations may be included.
  (a) A Sequence Parameter Set (SPS) allows the GPM to be used.
  (b) A coded picture region of the current block belongs to a bidirectional prediction slice (B slice).
  (c) There is made such a size limitation that both a width and height need to be more than or equal to 8 and less than or equal to 64, and both a width-height ratio and height-width ratio of the current block are less than 8.
  (d) Prediction for the current block is not general merge prediction, merge subblock prediction, affine prediction, or Composed Intra Inter Prediction (CIIP).

(e) The GPM is unavailable for a chroma component in a 4:0:0 format.

Table 1 shows CU-layer syntax descriptions corresponding the current block.

TABLE 1

|  | Descriptor |
|---|---|
| merge_data(x0, y0, cbWidth, cbHeight, cbType) { | |
| ... ... | |
|     merge_gpm_partition_idx[x0][y0] | ae(v) |
|     merge_gpm_idx0[x0][y0] | ae(v) |
|     if( MaxNumGpmMergeCand > 2 ) | |
|         merge_gpm_idx1[x0][y0] | ae(v) |
| ... ... } | | ae(v) represents a context-adaptive arithmetic entropy-coded syntax element. merge_gpm_partition_idx[x0][y0] represents partition information of the current block. merge_gpm_idx0[x0][y0] represents a position of an MV of partition A in a merge list. merge_gpm_idx1[x0][y0] represents a position of an MV of partition B in the merge list. MaxNumGpmMergeCand is determined by a list length of a motion information candidate list.

Figure 7:
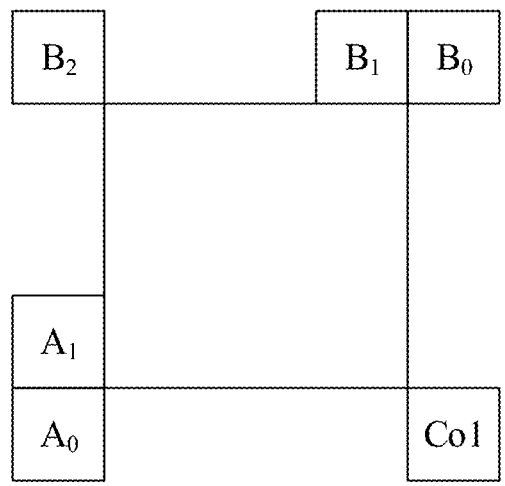
FIG. 7 is a schematic diagram of positions of neighbouring blocks in a spatial merge candidate list according to an embodiment of the disclosure.

In the inter prediction process, a motion information candidate list of the current block is further constructed based on the GPM parameter of the current block. FIG. 7 is a schematic diagram of positions of neighbouring blocks in a spatial merge candidate list according to an embodiment of the disclosure. As shown in FIG. 7, the neighbouring blocks in the merge candidate list are constructed based on the following sequence: a left neighbouring block A1, a top neighbouring block B1, a top-right neighbouring block B0, a bottom-left neighbouring block A0, a top-left neighbouring block B2, and a corresponding position block col of a reference frame. MV information of the neighbouring blocks is arranged sequentially and distinguished by different direction sources. It is to be noted that a historical reference block his, an average MV avg of first and second candidate MVs, and a zero MV 0 may further be added to the merge list.

Unidirectional or bidirectional MV information of the five neighbouring blocks in FIG. 7 is obtained, and the unidirectional or bidirectional MV information of each neighbouring block is added to the merge candidate list based on an addition sequence of the neighbouring blocks (A1-B1-B0-A0 (B2)) to form candidate items of the current block. B2 is a substitute. When at least one of the first four items is unavailable, the MV information of B2 needs to be added to the candidate list. The addition sequence of the neighbouring blocks represents a correlation between each MV information and MV information of the current block. That is, an addition sequence of the merge candidate list represents a probability that the candidate item is selected as the MV information of the current block, as well as the accuracy after the candidate item is selected as the MV information of the current block.

Figure 8:
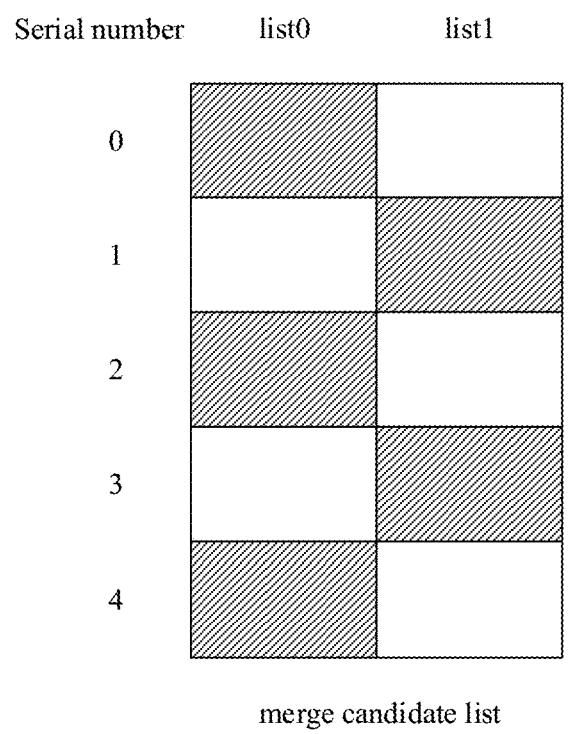
FIG. 8 is a composition structure diagram of a merge candidate list according to an embodiment of the disclosure.

FIG. 8 is a composition structure diagram of a merge list according to an embodiment of the disclosure. The merge candidate list in FIG. 8 is obtained based on the schematic diagram of positions of neighbouring blocks in FIG. 7. As shown in FIG. 8, the merge candidate list includes MV information of five neighbouring blocks, corresponding to serial numbers 0, 1, 2, 3, and 4 respectively. Each neighbouring block includes bidirectional prediction MV information, i.e., list0 and list1. In the GPM, only a unidirectional prediction mode is used for each partition. However, each item in the merge list may be bidirectional prediction MV information. Therefore, unidirectional prediction MVs need to be extracted for use. There is set X=(m & 0x01), where X represents reference list indication information used for indicating list0 and list1, and & represents a bitwise AND operation, namely the last bit of m is extracted (similar to parity check). In this way, MV information predFlagLXM corresponding to a reference frame in a reference list corresponding to X is preferentially used for partition prediction, such as items corresponding to the shaded regions in FIG. 8. If the corresponding MV is unavailable (the MV of the neighbouring block may be unidirectional), the opposite MV (MV represented by the blank region horizontally corresponding to the shaded region) is used, namely X=1-X.

Further, MVs of the two partitions (partition A first and then partition B) are acquired. A specific acquisition method includes the following operations.

merge_gpm_idx0[x0][y0] represents a position of an MV of partition A in the merge list.

There is set m=merge_gpm_idx0[xCb][yCb] for subsequent processing.

merge_gpm_idx1[x0][y0] represents a position of an MV of partition B in the merge list. The position of the MV of partition B in the merge list may be decreased by 1 because the option close to the front is selected for A.

There is set n=merge_gpm_idx1[xCb][yCb]+((merge_gpm_idx1[xCb][yCb]>=m)?1:0 for subsequent processing, where n represents a practical position of the MV selected for partition B in the merge candidate list.

There is set M=mergeGPMCandList[m]. The mth item is selected from the motion information candidate list for MV construction of partition A. The corresponding MV information is stored as a processing variable of partition A for subsequent prediction block construction.

In the GPM, only a unidirectional prediction mode is used for each partition. However, each item in the merge list may be bidirectional prediction MV information. Therefore, unidirectional prediction MVs need to be extracted for use. There is set X=(m & 0x01), where X represents reference list indication information used for indicating usage priorities of list0 and list1. X=0 indicates that MV information in list0 is preferentially used, and X=1 indicates that MV information in list1 is preferentially used. & represents a bitwise AND operation, namely the last bit of m is extracted (similar to parity check). In this way, MV information predFlagLXM corresponding to a reference frame in a reference list corresponding to X is preferentially used for partition prediction, such as items corresponding to the shaded regions in FIG. 8. If the corresponding MV is unavailable (the MV of the neighbouring block may be unidirectional), the opposite MV (MV represented by the blank region horizontally corresponding to the shaded region) is used, namely X=1-X.

mvA[0]=mvLXM[0]
mvA[1]=mvLXM[1]
refIdxA=refIdxLXM
predListFlagA=X mvA represents vectors of the MV of partition A in two directions, refIdxA represents a reference frame corresponding to the MV, and predListFlagA represents a list where a component of the MV candidate is selected presently.

There is set N=mergeCandList[n]. The nth item is selected from the motion information candidate list for MV construction of partition B.

A unidirectional MV of the nth item is used for mvB construction. The item corresponding to the shaded region in FIG. 8 is preferentially used, and if it is unavailable, the opposite MV is used. Therefore, there is set X=(n & 0x01). If predFlagLXN is unavailable, X=1−X.

In such case, the corresponding MV information is then stored as a processing variable of partition B for subsequent prediction block construction.

mvB[0]=mvLXN[0]
mvB[1]=mvLXN[1]
refIdxB=refIdxLXN
predListFlagB=X mvB represents vectors of the MV of partition B in two directions, refIdxB represents a reference frame corresponding to the MV, and predListFlagB represents a list where a component of the MV candidate is selected presently.

In some embodiments, after the motion information candidate list is constructed, the method further includes the following operations. When the number of candidate items in the motion information candidate list is larger than 2, first index information corresponding to the motion information of the first partition and second index information corresponding to the motion information of the second partition are acquired from the motion information candidate list, and the first index information and the second index information are written to a bitstream. Alternatively, when the number of candidate items in the motion information candidate list is equal to 2, first index information corresponding to the motion information of the first partition or second index information corresponding to the motion information of the second partition is acquired from the GPM motion information candidate list, and the first index information or the second index information is written to a bitstream. The encoder sends the bitstream to a decoder. The decoder parses the bitstream to determine the first index information corresponding to the motion information of the first partition and second index information corresponding to the motion information of the second partition in the motion information candidate list, and further acquires, based on the index information, the motion information of each partition from a motion information candidate list constructed at the decoder side.

In the embodiment of the disclosure, the partition information (i.e., the angle index information and the stride index information) also needs to be written to the bitstream during coding for use in decoding.

In 103, a first prediction value of a first partition of the current block and a second prediction value of a second partition of the current block are determined based on the GPM parameter of the current block.

In the embodiment of the disclosure, the GPM parameter includes the partition information of the current block, and the partition information specifically includes the angle index information and the stride index information. Therefore, the encoder may divide the current block based on the partition information to obtain the first partition and the second partition, and determine first motion information of a first reference block corresponding to the first partition and second motion information of a second reference block corresponding to the second partition from the motion information candidate list. The encoder performs motion compensation based on the first motion information to obtain the first prediction value of the first partition. The encoder performs motion compensation based on the second motion information to obtain the second prediction value of the second partition.

It is to be noted that, in the embodiments of the disclosure, the GPM uses an original unidirectional merge candidate list of the TPM in VVC7. That is, respective MVs, i.e., motion information, of two partitions obtained by the GPM are found from the unidirectional merge candidate list, and respective prediction values are acquired based on the respective motion information.

The merge candidate list generally includes elements for a preset number of reference blocks. The preset number may be 6. Each element stores data in form of a structural body. Each structural body may include motion information of the reference block, a reference frame list, a prediction direction, etc. When data corresponding to the GPM is stored, the data is stored by blocks of a size of 4×4.

In 104, a weight index of a sample in the current block is determined based on the GPM parameter of the current block, weight indexes of the samples determined based on different GPM parameters being not all even numbers.

A prediction process of the current block in the GPM in the encoder corresponding to VVC Draft8 will be introduced below in detail.

Figure 9:
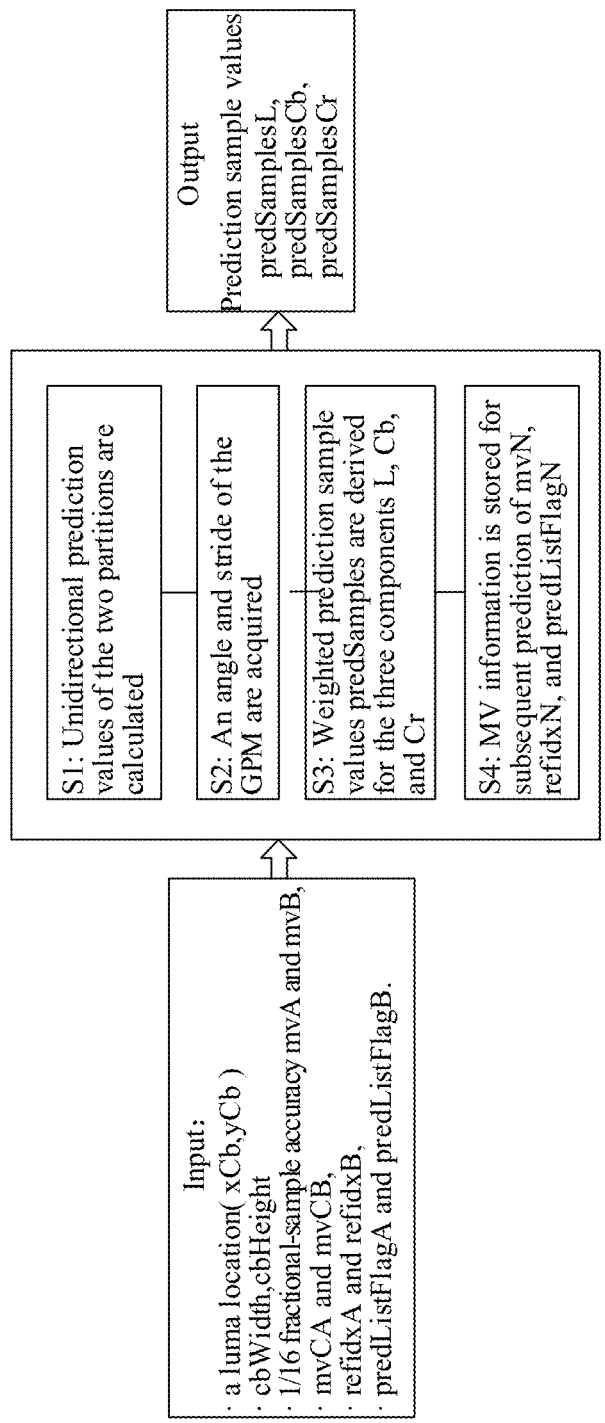
FIG. 9 is a schematic diagram of a GPM-based prediction process according to an embodiment of the disclosure.

FIG. 9 is a schematic diagram of a GPM-based prediction process according to an embodiment of the disclosure. An input of the prediction process includes:

a luma location(xCb,yCb)
cbWidth,cbHeight
1/16 fractional-sample accuracy mvA and mvB
mvCA and mvCB
refidxA and refidxB
predListFlagA and predListFlagB.

xCb and yCb represent a top-left sample position of a current Coding Block (CB), mvA and mvB represent MVs of a luma component, and mvCA and mvCB are MVs of a chroma component with 1/32 sample accuracy.

An output of the prediction process in FIG. 9 includes prediction sample values predSamplesL, predSamplesCb, and predSamplesCr.

For the input information, an intermediate prediction process specifically includes the following operations.

In S1, unidirectional prediction values of the two partitions are calculated.

The GPM reuses a conventional merge list, and constructs a unidirectional merge list of the GPM in the manner of parity check. Merge candidates of each of the two subpartitions divided by the GPM are selected from the unidirectional merge candidate list.

Then, reference frame lists refPicLN and predicted sample values predSamplesLN of sub-samples are derived for three components L, Cb, and Cr, N being A or B. In L, Cb, and Cr, L is Luma, representing a luma component, and both Cb and Cr are Chroma, representing chroma components. This operation is the same as a general inter prediction technology. That is, unidirectional motion compensation prediction values of the two partitions are calculated by use of an existing motion compensation method respectively for a subsequent final weighted merging process of the GPM. Motion compensation herein is the same as a conventional motion compensation process. That is, sample values of corresponding regions are found by MVs and duplicated.

In S2, an angle and stride of the GPM are acquired.

The encoder traverses the 64 partition modes corresponding to the GPM to determine a partition mode corresponding to the minimum rate distortion cost, namely determining a target partition mode for the current block. Then, the encoder may determine angle index information and stride index information corresponding to the target partition mode based on the target partition mode through a preset mapping table about partition modes, angle indexes, and stride indexes. When the GPM is used for the current prediction block, a corresponding angle angleIdx and stride distanceIdx may be searched in the table based on a partition mode index merge_gpm_partition_idx selected for the current block. Table 2 shows a mapping table of the partition modes.

TABLE 2

| | merge_gpm_partition_idx | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| angleIdx | 0 | 0 | 2 | 2 | 2 | 2 | 3 | 3 | 3 | 3 | 4 | 4 | 4 | 4 | 5 | 5 |
| distanceIdx | 1 | 3 | 0 | 1 | 2 | 3 | 0 | 1 | 2 | 3 | 0 | 1 | 2 | 3 | 0 | 1 |
| | merge_gpm_partition_idx | | | | | | | | | | | | | | | |
| | 16 | 17 | 18 | 19 | 20 | 21 | 22 | 23 | 24 | 25 | 26 | 27 | 28 | 29 | 30 | 31 |
| angleIdx | 5 | 5 | 8 | 8 | 11 | 11 | 11 | 11 | 12 | 12 | 12 | 12 | 13 | 13 | 13 | 13 |
| distanceIdx | 2 | 3 | 1 | 3 | 0 | 1 | 2 | 3 | 0 | 1 | 2 | 3 | 0 | 1 | 2 | 3 |
| | merge_gpm_partition_idx | | | | | | | | | | | | | | | |
| | 32 | 33 | 34 | 35 | 36 | 37 | 38 | 39 | 40 | 41 | 42 | 43 | 44 | 45 | 46 | 47 |
| angleIdx | 14 | 14 | 14 | 14 | 16 | 16 | 18 | 18 | 18 | 19 | 19 | 19 | 20 | 20 | 20 | 21 |
| distanceIdx | 0 | 1 | 2 | 3 | 1 | 3 | 1 | 2 | 3 | 1 | 2 | 3 | 1 | 2 | 3 | 1 |
| | merge_gpm_partition_idx | | | | | | | | | | | | | | | |
| | 48 | 49 | 50 | 51 | 52 | 53 | 54 | 55 | 56 | 57 | 58 | 59 | 60 | 61 | 62 | 63 |
| angleIdx | 21 | 21 | 24 | 24 | 27 | 27 | 27 | 28 | 28 | 28 | 29 | 29 | 29 | 30 | 30 | 30 |
| distanceIdx | 2 | 3 | 1 | 3 | 1 | 2 | 3 | 1 | 2 | 3 | 1 | 2 | 3 | 1 | 2 | 3 | wedge_partition_idx represents the partition mode index, angleIdx represents the angle index information, and distanceIdx represents the stride index information.

Figure 10:
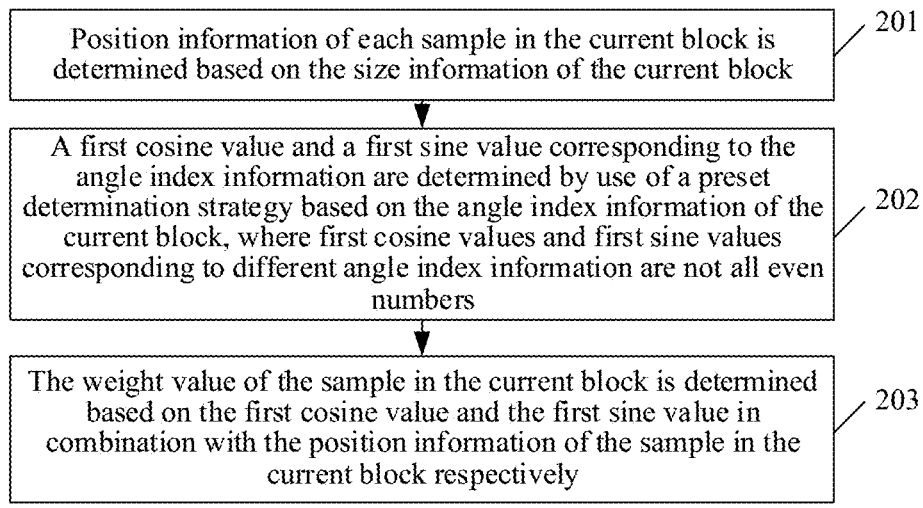
FIG. 10 is a schematic flowchart of determining weight indexes according to an embodiment of the disclosure.

In the embodiment of the disclosure, the GPM parameter of the current block includes size information and angle index information of the current block. The embodiment of the disclosure provides a specific implementation method of the operation in 104. As shown in FIG. 10, the method may include the following operations.

In 201, position information of each sample in the current block is determined based on the size information of the current block.

The size information of the current block includes a width and height of the current block. Specifically, an offset value (offsetX) of the current block in a horizontal direction and an offset value (offsetY) of the current block in a vertical direction are determined based on the width and height of the current block and an angle and stride of the partitioning line. Position information of each sample in the current block in a second coordinate system is determined based on offsetX and offsetY of the current block and position information of the sample in a first coordinate system.

Figure 11:
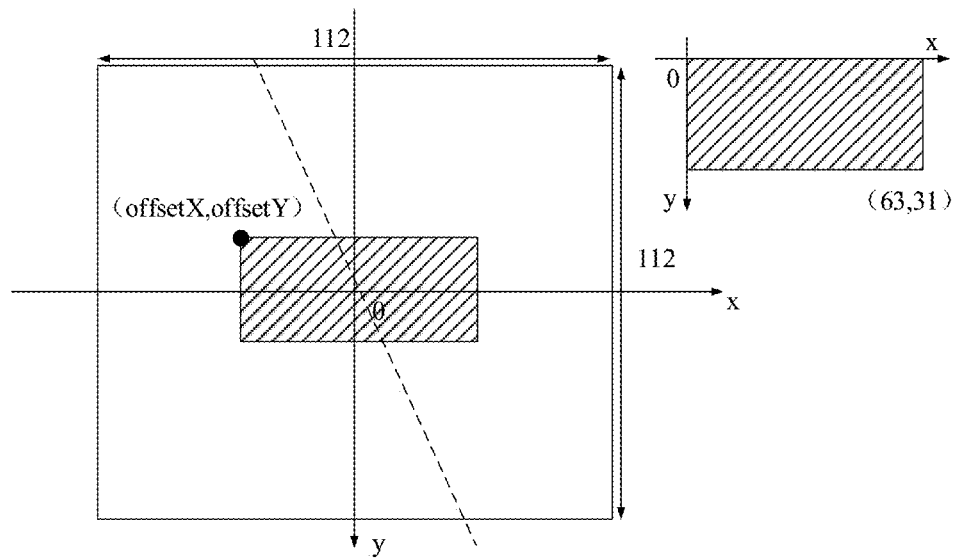
FIG. 11 is a schematic diagram of a partition mode for a current block according to an embodiment of the disclosure.

FIG. 11 is a schematic diagram of a partition mode for a current block according to an embodiment of the disclosure. As shown in FIG. 11, the dashed line represents the partitioning line, and the white background is a maximum moving range (112×112) of a maximum block (64×64) relative to the coordinate system, which is further determined after offset values (OffsetX, OffsetY) of the top-left corner of the current block corresponding to the coordinate origin is calculated based on the current block (the shaded region is the current block) and the partition mode for the current block according to present limitations. If the partitioning line does not pass through a center point of the block, a relative position of the partitioning line remains unchanged, and a position of the block in the coordinate system is changed, thereby implementing partitioning appropriately.

The first coordinate system is a coordinate system taking the top-left corner of the current block as the coordinate origin, i.e., the coordinate system on the right in FIG. 11. The second coordinate system is a coordinate system on the left in FIG. 11, and the partitioning line passes through the origin of this coordinate system. A specific determination process of the offset values may be implemented by the following formulas (4) to (7).

In S3, weighted prediction sample values predSamples are derived for the three components L, Cb, and Cr.

In S3.1, a prediction luma value of the current block is calculated.

In S3.1.1, a predefined weight matrix is clipped to obtain a weight mask matrix of the current luma block.

1) First, acquisition of the weight matrix requires calculation of the offset value Offset(x,y) of the top-left corner of the current block corresponding to the coordinate origin based on the current block and the partition mode for the current block. The coordinate origin is at a geometrical center point of a block of the same size, the partitioning line passing through the geometrical center point of the block at the same angle.

The following core parameters are needed for calculation of the offset value.

A distance between a sample (x1, y1) to the line $\cos \alpha \cdot x - \sin \alpha \cdot y = 0$ is $d = \cos \alpha \cdot x1 - \sin \alpha \cdot y1$. Therefore, an index number displacementX of $\alpha$ in $\cos(\alpha)$ corresponding to the current angle and a corresponding index number displacementY of $\alpha + \pi/2$ corresponding to $-\sin(\alpha) = \cos(\alpha + \pi/2)$ need to be acquired first.

$$\text{displacement}X = \text{angleIdx}; \tag{1}$$

$$\text{displacement}Y = (\text{displacement}X + 8)\%32; \tag{2}$$

A stride for construction of the predefined weight matrix is only a first stride (namely the partitioning line necessarily intersects with the center point of the block).

Since related information of partition A and partition B in the bitstream is transmitted in sequence, sequencing of the two partitions needs to follow a certain principle. That is, a partFlip value is calculated through the following formula, specifically as follows.

$$\text{partFlip} = (\text{angleIdx} >= 13 \;\&\&\; \text{angleIdx} <= 27)?0:1 \quad (3)$$

partFlip is used to indicate distribution positions of partition A and partition B in the current block. Specifically, if partFlip is 0, it indicates that the side where a distance weightIdx, subsequently obtained through formula (8), between a point and the partitioning line is negative is partition A and the opposite side of the partitioning line is partition B. If partFlip is 1, it indicates the opposite meaning, namely the side where weightIdx is positive is partition A and the opposite side (i.e., the side where weightIdx is negative) is partition B.

A key parameter shiftHor is calculated through the following two formulas.

$$h w \text{Ratio} = nH/nW \quad (4)$$

namely height of CU/width of CU.

$$\text{shiftHor} = (\text{angleIdx} \% 16 == 8 \;||\; (\text{angleIdx} \% 16 \,!= 0 \;\&\&\; hw\text{Ratio} > 0))?0:1 \quad (5)$$

shiftHor is used to determine a displacement direction between different partitioning lines at the same angle. If a value of shiftHor is 0, the partitioning line may be shifted on axis Y. If the value of shiftHor is 1, the partitioning line may be shifted on axis X.

Then, the offset values offsetX and offsetY of the current prediction block are calculated through formulas (6) to (7) based on the size and partition information of the current prediction block.

In case of shiftHor=0, the current block has an offset value related to the height of the current block in the vertical direction. In such case, the offset information is shown as follows.

$$\text{offsetX} = (-nW) >> 1$$

$$\text{offsetY} = ((-nH) >> 1) + \text{angleIdx} < 16? \\ (\text{distanceIdx} * nH) >> 3 : -((\text{distanceIdx} * nH) >> 3) \quad (6)$$

If an offset direction identifier is equal to 1, i.e., shiftHor is equal to 1, the current block has an offset value related to the width of the current block in the horizontal direction. In such case, the offset information is shown as follows.

$$\text{offsetX} = ((-nW) >> 1) + \text{angleIdx} < 16? \\ (\text{distanceIdx} * nW) >> 3 : -((\text{distanceIdx} * nW) >> 3)$$

$$\text{offsetY} = (-nH) >> 1 \quad (7)$$

">>" represents a right-shift operator, nW represents the width of the current block, and nH represents the height of the current block.

In 202, a first cosine value and a first sine value corresponding to the angle index information are determined by use of a preset determination strategy based on the angle index information of the current block. First cosine values and first sine values corresponding to different angle index information are not all even numbers.

In practical applications, the determination strategy includes acquiring the first cosine value and first sine value corresponding to the angle index information from a preset angle mapping table, or calculating the first cosine value and first sine value corresponding to the angle index information based on a preset calculation strategy. In the embodiment of the disclosure, three specific implementation modes are provided for each of the two manners.

In 203, the weight value of the sample in the current block is determined based on the first cosine value and the first sine value in combination with the position information of the sample in the current block respectively.

In the embodiment of the disclosure, there are six modes for the operation that the first cosine value and first sine value corresponding to the angle index information are determined by use of the preset determination policy based on the angle index information of the current block.

In the first mode, cosine angle index information and sine angle index information of the current block are determined based on the angle index information of the current block. The first cosine value is acquired from a preset angle mapping table based on the cosine angle index information. The first sine value is acquired from the preset angle mapping table based on the sine angle index information. Here, first cosine values and first sine values corresponding to different angle index information in the angle mapping table are not all even numbers.

In the embodiment of the disclosure, the method further includes that: the angle mapping table is constructed.

Specifically, a method for constructing the angle mapping table includes the following operations. Cosine angle index information and sine angle index information of the current block are determined based on the angle index information of the current block. The first cosine value is acquired from a preset angle mapping table based on the cosine angle index information. Second cosine values corresponding to M angle index information are obtained based on the M angle index information, M being even. A power reduction process is performed on the second cosine values corresponding to the M angle index information to obtain first cosine values corresponding to the M angle index information. The angle mapping table is constructed by use of the M angle index information and the corresponding first cosine values.

That is, cosine angle index information and sine angle index information are determined based on the angle index information. An angle mapping table is queried based on the cosine index information to obtain the first cosine value corresponding to the cosine angle index information. The angle mapping table is queried based on the sine angle index information to obtain the first sine value corresponding to the sine angle index information.

It is to be noted that, since the distance between the sample (x1, y1) and the line cos α·x−sin α·y=0 is d=cos α·x1−sin α·y1, after position information (x1, y1) of the sample is obtained, a pre-established mapping table of angle index information and cosine values, i.e., the angle mapping table, may be looked up based on α for cos(α) corresponding to α. In addition, −sin(α)=cos (α+π/2), so cos(α+π/2) corresponding to α+π/2, i.e., −sin(α), is found.

After the index number displacementX of α in cos(α) corresponding to the current angle and the corresponding index displacementY of α+π/2 corresponding to −sin(α) =cos(α+π/2) are obtained, cosine angle index information is obtained based on formula (1), and sine angle index information is obtained based on formula (2).

In addition, Table 3 is an exemplary angle mapping table provided in the embodiment of the disclosure, where idx represents the angle index information (displacementX and displacementY), and disLut[idx] corresponding to idx represents the cosine value corresponding to the angle. Table 3 is looked up based on displacementX to obtain the first cosine value. Table 3 is looked up based on displacementY to obtain the second sine value.

TABLE 3

| | idx | | | | | | | | | | | |
|---|---|---|---|---|---|---|---|---|---|---|---|---|
| | 0 | 2 | 3 | 4 | 5 | 6 | 8 | 10 | 11 | 12 | 13 | 14 |
| disLut[idx] | 4 | 4 | 4 | 2 | 2 | 1 | 0 | −1 | −2 | −2 | −4 | −4 |
| | idx | | | | | | | | | | | |
| | 16 | 18 | 19 | 20 | 21 | 22 | 24 | 26 | 27 | 28 | 29 | 30 |
| disLut[idx] | −4 | −4 | −4 | −2 | −2 | −1 | 0 | 1 | 2 | 2 | 4 | 4 |

After the offset information offsetX and offsetY is determined, a weight index value (represented by weightIdx) at the current sample may be calculated based on a position of the sample in the current block, the first sine value (disLut[displacementX]), and the first cosine value (disLut[displacementY]), and a weight value at the current sample may further be calculated through formulas (9) to (10), thereby obtaining the weight matrix of the current block.

$$\text{weightIdx}=(((x*\text{sub}W+\text{offsetX})<<1)+1)*\text{disLut[displacementX]}+(((y*\text{sub}H+\text{offsetY})<<1)+1)*\text{disLut[displacementY]}. \quad (8)$$

$$\text{weightIdx}L=\text{partFlip}?16+\text{weightIdx}:16-\text{weightIdx} \quad (9)$$

$$w\text{Value}=\text{Clip3}(0,8,(\text{weightIdx}L+2)>>2) \quad (10)$$

clip3 represents a clipping operator, 0 represents a lower limit value, and 8 represents an upper limit value. For example, clip3(i, j, x) represents that: x is valued to i when x is less than i; x is valued to j when x is greater than j; and x is valued to x when x is more than or equal to i and less than or equal to j. $(((x*\text{sub}W+\text{offsetX})<<1)+1)$ represents a horizontal coordinate obtained by doubling an original horizontal coordinate of the sample. $(((y*\text{sub}H+\text{offsetY})<<1)+1)$ represents a vertical coordinate obtained by doubling an original vertical coordinate of the sample. displacementX represents the cosine angle index information. disLut[displacementX] is used to obtain the first cosine value from Table 3. displacementY represents the sine angle index information. disLut[displacementY] is used to obtain the first sine value from Table 3.

disLut[ ] used in formula (8) is as shown in Table 4. subW and subH represent down-sampling rates. If a YUV format of the current block is 420 format, subW and subH may both be 2. The used disLut[ ] is as shown in Table 4. subW and subH represent down-sampling rates, and if the 420 format is used, subW and subH are both 2. Luma does not need down-sampling, and chroma weights are obtained by down-sampling luma weights, referring to S3.2.

In practical applications, weightIdxL in formula (9) represents an extended weight index value obtained by extending weightIdx in formula (8). weightIdxL and weightIdx may both be regarded as the weight index. The weight index determination method proposed in the embodiment of the disclosure is for weightIdx.

Table 4 is an example of an existing angle mapping table. All cosine values corresponding to angle indexes are even, so weightIdx obtained through formula (8) in case of any angle index is even, namely the last bit is always 0. In such case, there is an unnecessary bit overhead. The cosine values in the existing angle mapping table are extended by eight times, so each cosine value is even, and weight indexes are all even numbers. In the disclosure, the angle mapping table is modified, namely a power reduction process is performed on the cosine values in the existing angle mapping table, such that the storage bit number of each item is reduced from 5 to 4, the cosine values in the updated angle mapping table are not all even numbers, and the value range of the cosine value changes to [−4, −4]. Reducing the bit number of each item in the angle mapping table from 5 to 4 saves one bit and reduces the bit overhead.

TABLE 4

| | idx | | | | | | | | | | | |
|---|---|---|---|---|---|---|---|---|---|---|---|---|
| | 0 | 2 | 3 | 4 | 5 | 6 | 8 | 10 | 11 | 12 | 13 | 14 |
| disLut[idx] | 8 | 8 | 8 | 4 | 4 | 2 | 0 | −2 | −4 | −4 | −8 | −8 |
| | idx | | | | | | | | | | | |
| | 16 | 18 | 19 | 20 | 21 | 22 | 24 | 26 | 27 | 28 | 29 | 30 |
| disLut[idx] | −8 | −8 | −8 | −4 | −4 | −2 | 0 | 2 | 4 | 4 | 8 | 8 |

In 105, a first weight value and a second weight value of the sample in the current block are determined based on the weight index of the sample in the current block.

In the embodiment of the disclosure, the second weight value is obtained based on the first weight value. For example, second weight value=1−first weight value. A first weight value of a current sample is determined through formulas (9) and (10). The weight value in formula (10) ranges from 0 to 8, so second weight value=8−first weight value.

In 106, based on a first prediction value and first weight value of a sample in the first partition and a second prediction value and second weight value of a sample in the second partition, weighted merging is performed on the first prediction values and the second prediction values to obtain the inter prediction value of the current block.

In some embodiments of the disclosure, a weighted merging calculation formula for a prediction luma value is provided in S3.1.2, and a prediction chroma value is determined in S3.2.

In S3.1.2, sample-wise weighting is performed on the unidirectional prediction values of the two partitions to obtain a final GPM-based prediction block. Weighted calculation is specifically implemented through formula (11).

$$pb\text{Samples}[x][y]=\text{Clip3}(0,(1<<\text{BitDepth})-1,(\text{predSamples}LA[x][y]*w\text{Value}+\text{predSamples}LB[x][y]*(8-w\text{Value})+\text{offset1})>>\text{shift1}) \quad (11)$$

BitDepth represents a bit depth. offset1 is used for rounding. shift1 is used to recover a prediction value obtained by weighted averaging to the same bit depth as an input video. predSamplesLA[x][y] represents a first prediction luma value of a sample in partition A. predSamplesLB[x][y] represents a second prediction luma value of a sample in partition B. A prediction luma value of the samples in the current block is obtained through formula (11). offset1 and shift1 are calculated through formulas (12) to (13).

$$\text{shift1}=\text{Max}(5,17-\text{BitDepth} \quad (12)$$

$$\text{offset1}=1*<(\text{shift1}-1) \quad (13)$$

In S3.2, prediction values of the current chroma blocks (Cb and Cr) are calculated.

A luma sample weight of a top-left corner of each 2*2 block in FIG. 12A is acquired directly as a chroma sample weight at the current position (x, y). That is, the luma sample weights are down-sampled to obtain a chroma weight matrix of the current block in FIG. 12B. Weighted calculation for the chroma is also implemented through formula (11). Based on a first prediction chroma value and first weight value of each sample in the first partition and a second prediction chroma value and second weight value of each sample in the second partition, weighted merging is performed on the first prediction values and the second prediction values to calculate a prediction chroma value of the current block.

The sampling relationship of luma and chroma weight matrices are is shown in FIGS. 12A and 12B.

The prediction luma value and prediction chroma value of the current picture block are obtained by S3.1 and S3.2.

In S4, MV information is stored for subsequent prediction of mvN, refidxN, and predListFlagN. That is, after the prediction value of the current block is obtained, the MV information of the current block further needs to be stored for MV information of a subsequent picture block prediction.

In practical applications, storing the MV information of the current block refers to storing MV information of a 4×4 SB in the current block. When the MV information is stored, it is necessary to determine motion index information of the SB first and determine, based on the motion index information of the SB, whether unidirectional MV information or bidirectional MV information of the SB is to be stored.

Figure 13:
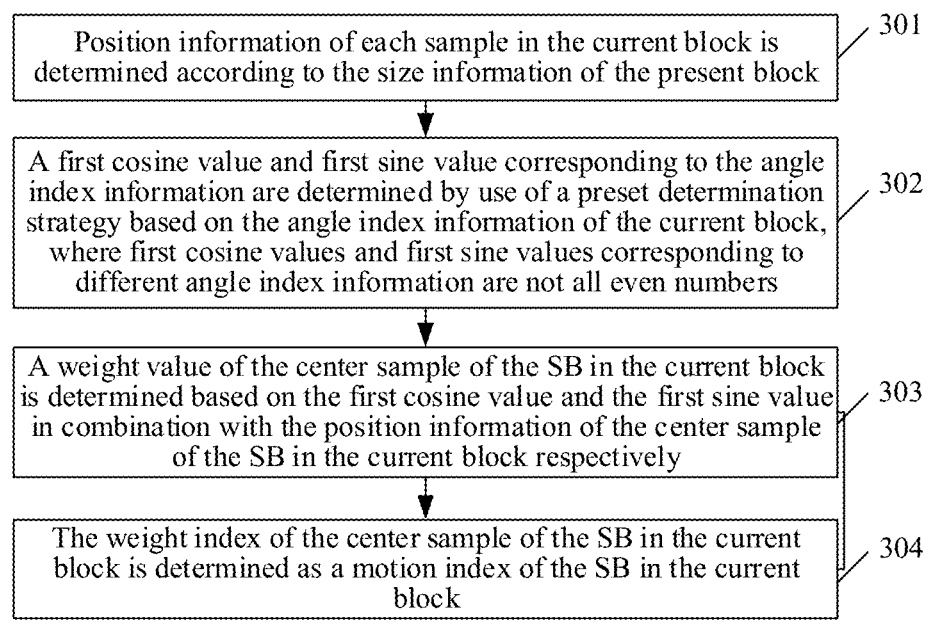
FIG. 13 is a flowchart of a method for determining motion index information of a Subblock (SB) in a current block according to an embodiment of the disclosure.

FIG. 13 is a flowchart of a method for determining motion index information of an SB in a current block according to an embodiment of the disclosure. As shown in FIG. 13, the method for determining the motion index information of the SB in the current block may specifically include the following operations.

In 301, position information of a center sample of each SB in the current block is determined based on the size information of the current block.

The size information of the current block includes a width and height of the current block. Specifically, an offset value (offsetX) of the current block (offsetY) in a horizontal direction and an offset value (offsetY) of the current block in a vertical direction are determined based on the width and height of the current block and an angle and stride of the partitioning line. Position information of a center sample of each SB in a second coordinate system is determined based on offsetX and offsetY of the current block and position information of the center sample of the SB in a first coordinate system.

The motion mask matrix of the current block is still calculated by taking a 4×4 SB a unit. The position information of the center sample of the SB in the current block refers to position information of the center (4i+2, 4j+2) of each 4×4 SB. The calculation of a motion index (motionIdx) at the center (4i+2, 4j+2) of each 4×4 SB is the same as that of the weight index of the sample in the current block, i.e., weightIdx in formula (8).

In 302, a first cosine value and first sine value corresponding to the angle index information are determined by use of a preset determination strategy based on the angle index information of the current block. First cosine values and first sine values corresponding to different angle index information are not all even numbers.

Specifically, cosine angle index information and sine angle index information of the current block are determined based on the angle index information of the current block. The first cosine value is acquired from a preset angle mapping table based on the cosine angle index information. The first sine value is acquired from the preset angle mapping table based on the sine angle index information. Here, first cosine values and first sine values corresponding to different angle index information in the angle mapping table are not all even numbers.

In the embodiment of the disclosure, the method further includes that: the angle mapping table is constructed.

Specifically, a method for constructing the angle mapping table includes the following operations. Cosine angle index information and sine angle index information of the current block are determined based on the angle index information of the current block. The first cosine value is acquired from a preset angle mapping table based on the cosine angle index information. Second cosine values corresponding to M angle index information are obtained based on the M angle index information, M being even. A power reduction process is performed on the second cosine values corresponding to the M angle index information to obtain first cosine values corresponding to the M angle index information. The angle mapping table is constructed by use of the M angle index information and the corresponding first cosine values.

That is, cosine angle index information and sine angle index information are determined based on the angle index information. The angle mapping table is queried based on the cosine index information to obtain the first cosine value corresponding to the cosine angle index information. The angle mapping table is queried based on the sine angle index information to obtain the first sine value corresponding to the sine angle index information.

In 303, a weight value of the center sample of the SB in the current block is determined based on the first cosine value and the first sine value in combination with the position information of the center sample of the SB in the current block respectively.

In 304, the weight index of the center sample of the SB in the current block is determined as a motion index of the SB in the current block.

In 305, a storage type of motion information of the SB in the current block is determined based on motion index information of the SB in the current block. The storage type includes storage of unidirectional motion information or storage of bidirectional motion information.

A storage process of the motion information (also referred to as "MV information") is implemented by use of a motion mask matrix of the current luma block. If the prediction value is completely from partition A, an MV of partition A is recorded. If the prediction value is completely from SBs of partition B, an MV of partition B is recorded. Otherwise, MVs of both partitions are simultaneously recorded. The calculation of a motion mask is substantially the same as that of the luma weight matrix. An offset is calculated first. The offset is calculated through formulas (14) to (15).

If an offset direction identifier is equal to 0, namely shiftHor is equal to 0, the offset information is shown as follows.

$$\text{offsetX}=(-\text{cbWidth})\gg 1$$

$$\begin{aligned}\text{offsetY}=&((-\text{cbHeight})\gg 1)+(\text{angleIdx}<16?\\&(\text{distanceIdx}*\text{cbHeight})\gg 3:-\\&((\text{distanceIdx}*\text{cbHeight})\gg 3))\end{aligned} \quad (14)$$

If the offset direction identifier is equal to 1, namely shiftHor is equal to 1, the offset information is shown as follows.

$$\begin{aligned}\text{offsetX}=&((-\text{cbWidth})\gg 1)+(\text{angleIdx}<16?\\&(\text{distanceIdx}*\text{cbWidth})\gg 3:-\\&((\text{distanceIdx}*\text{cbWidth})\gg 3))\end{aligned}$$

$$\text{offsetY}=(-\text{cbHeight})\gg 1 \quad (15)$$

cbWidth represents the width of the current block, and cbHeight represents the height of the current block.

Since the motion mask matrix of the GPM-based prediction block is still calculated by taking a 4×4 SB as a unit, the calculation of a motion index (which may be represented by motionIdx) at a geometrical center (4i+2, 4j+2) of each 4×4 SB is similar to that of the weight index value weightIdx in formula (8), specifically as follows.

$$\text{motionIdx}=(((4*x\text{SbIdx}+\text{offset}X)<<1)+5)*\text{disLut}[\text{displacement}X]+(((4*y\text{SbIdx}+\text{offset}Y)<<1)+5)*\text{disLut}[\text{displacement}Y] \quad (16)$$

$(((4*x\text{SbIdx}+\text{offsetX})<<1)+5)$ represents a horizontal coordinate obtained by doubling an original horizontal coordinate of the center sample of the SB. $(((4*y\text{SbIdx}+\text{offsetY})<<1)+5)$ represents a vertical coordinate obtained by doubling an original vertical coordinate of the center sample of the SB. disLut[displacementX] is used to obtain the first cosine value from Table 3. disLut[displacementY] is used to obtain the first sine value from Table 3. Then, MV information that needs to be stored for the current 4×4 SB is determined. Like predictive weighting, it is required to determine whether the current SB is in partition A or in partition B first.

$$\text{partIdx}=(\text{angleIdx}>=13\ \&\&\ \text{angleIdx}<=27)?0:1 \quad (17)$$

(xSbIdx, ySbIdx) represents SB coordinates of each 4×4 SB (subblock, sb) in the current CU. Ranges of the coordinates are xSbIdx=0 . . . numSbX−1 and ySbIdx=0 . . . numSbY−1. partIdx represents whether the two partitions need to be flipped.

$$s\text{Type}=\text{abs}(\text{motionIdx})<32?2:(\text{motionIdx}<=0?(1-\text{partIdx}):\text{partIdx}) \quad (18)$$

It is to be noted that formula (18) is a typo error, and the correct expression is as follows.

$$s\text{Type}=\text{abs}(\text{motionIdx})<16?2:(\text{motionIdx}<=0?\text{partIdx}:(1-\text{partIdx})) \quad (18)$$

Alternatively, the same correction effect may be achieved by swapping values 0 and 1 in formula (17).

The embodiment of the disclosure also adopts the above inter prediction before and after modification.

Then, sType is obtained based on the magnitude of abs(motionIdx) at the geometrical center (4i+2, 4j+2) of each 4×4 SB, and it is determined based on sType whether a unidirectional MV or bidirectional MV of the current SB is to be stored. A specific determination process is as follows. If sType is 2, the current SB stores the constructed bidirectional MV. If sType is 0, the current SB stores MVA of the first partition. If sType is 1, the current SB stores MVB of the second partition.

That is, when the storage type of the motion information of the SB in the current block is determined based on the motion index information of the SB in the current block, sType is determined first based on the motion index information of the SB, and then the storage type of the motion information of the SB is determined based on sType. The stored MV information is used for MV prediction of a subsequent coding block.

Further, the encoder performs a coding process for a related syntax of the GPM.

In the encoder, the GPM and another inter prediction mode are considered as mutually competitive modes. The modes are selected based on RDO or other strategies, and a selection result is transmitted to the decoder in form of a syntax element in a bitstream, i.e., a write operation of the syntax of the CU. This process is the inverse of the parsing process. Reference option position information m and n selected from the merge list for the two partitions A and B respectively are obtained first, and then syntax elements are assigned based on the following formulas.

$$\text{merge\_gpm\_idx}0[xCb][yCb]=m$$

$$\text{merge\_gpm\_idx}1[xCb][yCb]=n-(\text{merge\_gpm\_idx}1[xCb][yCb]>=m)?1:0$$

Then, these values are binarized and entropy coded, and finally written into a bitstream for transmission.

With the above-mentioned technical solution, when weight indexes of samples are calculated, a power reduction process may be performed by use of a preset calculation strategy during the calculation of the weight indexes, so that the obtained weight indexes are not all even numbers. Therefore, on the basis of not changing the coding/decoding performance, the problem in the existing solution that intermediate index data includes redundant bits is solved, corresponding contextual calculation parameters are modified to reduce the bit number needed by the intermediate calculation process, the bit overhead may be reduced, and the storage efficiency may be improved.

In the embodiment of the disclosure, a second mode of determining the first cosine value and the first sine value is also provided.

In the second mode, cosine angle index information and sine angle index information of the current block are determined based on the angle index information of the current block. The first cosine value is acquired from a preset angle mapping table based on the cosine angle index information. The first sine value is acquired from the preset angle mapping table based on the sine angle index information. First cosine values and first sine values corresponding to different angle index information in the angle mapping table are not all even numbers.

In the embodiment of the disclosure, the method further includes that: the angle mapping table is constructed.

Specifically, a method for constructing the angle mapping table includes the following operations. Cosine angle index information and sine angle index information of the current block are determined based on the angle index information of the current block. The first cosine value is acquired from a preset angle mapping table based on the cosine angle index information. Second cosine values corresponding to M angle index information are obtained based on the M angle index information, M being even. A power reduction process is performed on the second cosine values corresponding to the M angle index information to obtain first cosine values corresponding to the M angle index information. The first cosine values corresponding to the first M/2 angle index information are acquired from the M angle index information based on the M angle index information and the corresponding first cosine values. The angle mapping table is constructed by use of the first M/2 angle index information and the corresponding first cosine values.

It can be seen from Table 3 that the first cosine values corresponding to the angle index information are cyclically distributed based on a preset arrangement sequence. Therefore, to save the storage space, the repeated contents of the second half in Table 3 may be omitted, and the contents of the second half may be derived from the first half.

In Table 3, M is 24. The first 12 sets of mapping relationships in Table 3 are extracted to form a new angle mapping table (Table 5).

TABLE 5

| idx | 0 | 2 | 3 | 4 | 5 | 6 | 8 | 10 | 11 | 12 | 13 | 14 |
|---|---|---|---|---|---|---|---|---|---|---|---|---|
| disLut[idx] | 4 | 4 | 4 | 2 | 2 | 1 | 0 | -1 | -2 | -2 | -4 | -4 |

Based on Table 5, formula (8) may be transformed to formula (8-1).

$$\text{weightIdx}=(((x*\text{sub}W+\text{offset}X)<<1)+1)*(\text{displacementX}>=16?-\text{disLut}[\text{displacementX}\%16]:\text{disLut}[\text{displacementX}])+(((y*\text{sub}H+\text{offset}Y)<<1)+1)*(\text{displacementY}>=16?-\text{disLut}[\text{displacementY}\%16]:\text{disLut}[\text{displacementY}]) \quad (8\text{-}1)$$

$(((x*\text{sub}W+\text{offset}X)<<1)+1)$ represents a horizontal coordinate obtained by doubling the original horizontal coordinate of the sample, and $(((y*\text{sub}H+\text{offset}Y)<<1)+1)$ represents a vertical coordinate obtained by doubling the original vertical coordinate of the sample. They have the same meanings as formula (8). $(\text{displacementX}>=16?-\text{disLut}[\text{displacementX}\%16]:\text{disLut}[\text{displacementX}])$ is used to obtain the first cosine value from Table 5. $(\text{displacementY}>=16?-\text{disLut}[\text{displacementY}\%16]:\text{disLut}[\text{displacementY}])$ is used to obtain the first sine value from Table 5.

In case of displacementX>=16, a mod value is obtained based on displacementX %16, then Table 5 is queried based on the mod value to obtain a cosine value corresponding to displacementX, and a negative value of the cosine value is determined as the first cosine value. In case of displacementX<16, the cosine value corresponding to displacementX is obtained directly.

Similarly, in case of displacementY>=16, a mod value is obtained based on displacementY %16, then Table 5 is queried based on the mod value to obtain a sine value corresponding to displacementY, and a negative value of the sine value is determined as the first sine value. In case of displacementX<16, the sine value corresponding to displacementX is obtained directly as the first sine value.

Formulas (9) and (10) remain unchanged.

Similarly, when the MV storage related parameter is calculated, the motion index of the SB in the current block may be determined based on the updated angle mapping table.

Based on Table 5, formula (16) may be transformed to formula (16-1).

$$\text{motionIdx}=(((4*x\text{SbIdx}+\text{offset}X)<<1)+5)*(\text{displacementX}>=16?-\text{disLut}[\text{displacementX}\%16]:\text{disLut}[\text{displacementX}])+(((4*y\text{SbIdx}+\text{offset}Y)<<1)+5)*(\text{displacementY}>=16?-\text{disLut}[\text{displacementY}\%16]:\text{disLut}[\text{displacementY}]) \quad (16\text{-}1)$$

$(((4*x\text{SbIdx}+\text{offset}X)<<1)+5)$ represents a horizontal coordinate obtained by doubling an original horizontal coordinate of the center sample of the SB, and $(((4*y\text{SbIdx}+\text{offset}Y)<<1)+5)$ represents a vertical coordinate obtained by doubling an original vertical coordinate of the center sample of the SB. They have the same meanings as formula (16). $(\text{displacementX}>=16?-\text{disLut}[\text{displacementX}\%16]:\text{disLut}[\text{displacementX}])$ is used to obtain the first cosine value from Table 5. $(\text{displacementY}>=16?-\text{disLut}[\text{displacementY}\%16]:\text{disLut}[\text{displacementY}])$ is used to obtain the first sine value from Table 5.

In case of displacementX>=16, a mod value is obtained based on displacementX %16, then Table 5 is queried based on the mod value to obtain a cosine value corresponding to displacementX, and a negative value of the cosine value is determined as the first cosine value. In case of displacementX<16, the cosine value corresponding to displacementX is obtained directly as the first cosine value.

Similarly, in case of displacementY>=16, a mod value is obtained based on displacementY %16, then Table 5 is queried based on the mod value to obtain a sine value corresponding to displacementY, and a negative value of the sine value is determined as the first sine value. In case of displacementY<16, the sine value corresponding to displacementY is obtained directly as the first sine value.

Formulas (17) and (18) remain unchanged.

It can be understood that the angle mapping table records cosine values corresponding to 24 angles from 0 to 360°. Numerical values and signs of the cosine values corresponding to each angle in four quadrants are cyclically distributed based on certain rules. Therefore, the angle mapping table may be constructed by use of mapping relationships between angles and cosine values in only two quadrants, and then mapping relationships between angles and cosine values in the other two quadrants are derived by use of the angle mapping table. As such, the length of the original Table 3 is halved, the storage space is saved, and inter prediction effects of the picture completely the same as those of the conventional art are achieved.

In the embodiment of the disclosure, a third mode of determining the first cosine value and the first sine value is also provided.

In the third mode, cosine angle index information and sine angle index information of the current block are determined based on the angle index information of the current block. The first cosine value is acquired from a preset angle mapping table based on the cosine angle index information. The first sine value is acquired from the preset angle mapping table based on the sine angle index information. First cosine values and first sine values corresponding to different angle index information in the angle mapping table are not all even numbers.

In the embodiment of the disclosure, the method further includes that: the angle mapping table is constructed.

Cosine angle index information and sine angle index information of the current block are determined based on the angle index information of the current block. The first cosine value is acquired from the preset angle mapping table based on the cosine angle index information. Second cosine values corresponding to M angle index information are obtained based on the M angle index information, M being even. A power reduction process is performed on the second cosine values corresponding to the M angle index information to obtain first cosine values corresponding to the M angle index information. The first cosine values corresponding to the first M/4+1 angle index information are acquired from the M angle index information based on the M angle index information and the corresponding first cosine values. The angle mapping table is constructed by use of the first M/4+1 angle index information and the corresponding first cosine values.

It can be seen from Table 3 that the first cosine values corresponding to the angle index information are cyclically distributed based on a preset arrangement sequence. Absolute values of the first half in Table 3 are symmetrically distributed, but signs are opposite. Based on this feature, only the first seven items in the first half may be retained to construct the angle mapping table, and the contents of the other part may be derived by use of the first seven items.

In Table 3, M is 24. The first 7 sets of mapping relationships in Table 3 are extracted to form a new angle mapping table (Table 6).

TABLE 6

| idx | 0 | 2 | 3 | 4 | 5 | 6 | 8 |
|---|---|---|---|---|---|---|---|
| disLut[idx] | 4 | 4 | 4 | 2 | 2 | 1 | 0 |

Based on Table 6, formula (8) may be transformed to formula (8-2).

weightIdx=(((x*subW+offsetX)<<1)+1)*
(displacementX<8?disLut[displacementX]:displacementX<16?-disLut[16-displacementX]:
displacementX<24?-disLut[displacementX-16]:
disLut[32-displacementX])+(((y*subH+offsetY)<<1)+1)*(displacementY<8?disLut
[displacementY]:displacementY<16?-disLut[16-displacementY]:displacementY<24?-disLut
[displacementY-16]:disLut[32-displacementY])       (8-2)

(((x*subW+offsetX)<<1)+1) represents a horizontal coordinate obtained by doubling the original horizontal coordinate of the sample, and (((y*subH+offsetY)<<1)+1) represents a vertical coordinate obtained by doubling the original vertical coordinate of the sample. They have the same meanings as formula (8). (displacementX<8?disLut[displacementX]:displacementX<16?-disLut[16-displacementX]:displacementX<24?-disLut [displacementX-16]: disLut [32-displacementX]) is used to obtain the first cosine value from Table 6. (displacementY<8?disLut[displacementY]:displacementY<16?-disLut[16-displacementY]: displacementY<24?-disLut [displacementY-16]: disLut [32-displacementY]) is used to obtain the first sine value from Table 6.

In case of displacementX<8, a cosine value corresponding to displacementX is obtained directly as the first cosine value. In case of displacementX>=8 and displacementX<16, a cosine value corresponding to 16-displacementX is obtained, and a negative value of the cosine value is determined as the first cosine value. In case of displacementX>=8, displacementX>=16, and displacementX<24, the cosine value corresponding to dispalcementX-16 is obtained, and a negative value of the cosine value is determined as the first cosine value. In case of displacementX>=8, displacementX>=16, and displacementX>=24, a cosine value corresponding to 32-displacementX is obtained, and the cosine value is determined as the first cosine value.

In case of displacementY<8, a sine value corresponding to displacementY is obtained directly as the first sine value. In case of displacementY>=8 and displacementY<16, a sine value corresponding to 16-displacementY is obtained, and a negative value of the sine value is determined as the first sine value. In case of displacementY>=8, displacementY>=16, and displacementY<24, the sine value corresponding to displacementY-16 is obtained, and a negative value of the sine value is determined as the first sine value. In case of displacementY>=8, displacementY>=16, and displacementY>=24, a sine value corresponding to 32-displacementY is obtained, and the sine value is determined as the first sine value.

Formulas (9) and (10) remain unchanged.

Similarly, when the MV storage related parameter is calculated, the motion index of the SB in the current block may be determined based on the updated angle mapping table.

Based on Table 6, formula (16) may be transformed to formula (16-2).

motionIdx=(((4*xSbIdx+offsetX)<<1)+5)*
(displacementX<8?disLut[displacementX]:displacementX<16?-disLut[16-displacementX]:
displacementX<24?-disLut[displacementX-16]:
disLut[32-displacementX])+4(4*ySbIdx+offsetY)
<<1)+5)*(displacementY<8?disLut
[displacementY]:displacementY<16?-disLut[16-displacementY]:displacementY<24?-disLut
[displacementY-16]: disLut[32-displacementY])       (16-2)

(((4*xSbIdx+offsetX)<<1)+5) represents a horizontal coordinate obtained by doubling an original horizontal coordinate of the center sample of the SB, and (((4*ySbIdx+offsetY)<<1)+5) represents a vertical coordinate obtained by doubling an original vertical coordinate of the center sample of the SB. They have the same meanings as formula (16). (displacementX<8?disLut[displacementX]: displacementX<16?-disLut [16-displacementX]: displacementX<24?-disLut [displacementX-16]: disLut [32-displacementX]) is used to obtain the first cosine value from Table 6. (displacementY<8?disLut [displacementY]: displacementY<16?-disLut [16-displacementY]: displacementY<24?-disLut [displacementY-16]: disLut [32-displacementY]) is used to obtain the first sine value from Table 6.

In case of displacementX<8, a cosine value corresponding to displacementX is obtained directly as the first cosine value. In case of displacementX>=8 and displacementX<16, a cosine value corresponding to 16-displacementX is obtained, and a negative value of the cosine value is determined as the first cosine value. In case of displacementX>=8, displacementX>=16, and displacementX<24, the cosine value corresponding to displacementX-16 is obtained, and a negative value of the cosine value is determined as the first cosine value. In case of displacementX>=8, displacementX>=16, and displacementX>=24, a cosine value corresponding to 32-displacementX is obtained, and the cosine value is determined as the first cosine value.

It can be understood that the angle mapping table records cosine values corresponding to 24 angles from 0 to 360°. Numerical values and signs of the cosine values corresponding to each angle in four quadrants are cyclically distributed based on certain rules. Therefore, the angle mapping table may be constructed by use of mapping relationships between angles and cosine values in only one quadrant, and then mapping relationships between angles and cosine values in the other three quadrants are derived by use of the angle mapping table. As such, the original Table 3 is shortened to a quarter, the storage space is saved, and inter prediction effects of the picture completely the same as those of the conventional art are achieved.

With the first mode, the power reduction process is performed on angle mapping values in the original angle mapping table to obtain the updated angle mapping table, and the weight indexes corresponding to the angle information are obtained by use of the updated angle mapping table, so that the obtained weight indexes are not all even numbers. Therefore, on the basis of not changing the coding/decoding performance, the weight index bit overhead and the storage bit overhead of the angle mapping table may be reduced, and the storage efficiency may be improved. In the second mode and the third mode, the weight indexes corresponding to the angle information are obtained by use of part of angle mapping values in the updated angle mapping table, so that the bit overhead for storing the angle mapping table is further reduced.

In the embodiment of the disclosure, the operation that the first cosine value and first sine value corresponding to the angle index information are determined by use of the preset determination strategy based on the angle index information of the current block includes that: the first cosine value and first sine value corresponding to the angle index information are calculated by use of a preset calculation strategy based on the angle index information of the current block. First cosine values and first sine values calculated based on different angle index information being not all even numbers.

Specifically, a sign of the first cosine value is determined based on the cosine angle index information, and an absolute value of the first cosine value is calculated based on the cosine angle index information. A sign of the first sine value is determined based on the sine angle index information, and an absolute value of the first sine value is calculated based on the sine angle index information.

Alternatively, a sign of the first cosine value is determined based on the sine angle index information, and an absolute value of the first cosine value is calculated based on the cosine angle index information. A sign of the first sine value is determined based on the cosine angle index information, and an absolute value of the first sine value is calculated based on the sine angle index information.

In the embodiment of the disclosure, a fourth mode of determining the first cosine value and the first sine value is also provided.

In the fourth mode, the first cosine value and first sine value corresponding to the angle index information are calculated by use of a first calculation strategy based on the angle index information of the current block. First cosine values and first sine values calculated based on different angle index information are not all even numbers.

That is, in the fourth mode, the first cosine value and first sine value corresponding to the angle index information are calculated without any angle mapping table. Formula (8) may be transformed to formulas (8-3) and (8-4).

$$\text{weightIdx} = \text{displacement}X\%16 == 8?0:(((x^*\text{sub}W + \text{offset}X) << 1) + 1)^* \\ (((\text{distancement}X > 8\&\&\text{distancement}X < 24)?(-1): \\ 1)^*(((\text{displacement}X + 4)\%16 <= 8\&\& \\ (\text{displacement}X + 4)\%16! = 0)?4:(\text{abs} \\ (\text{displacement}X\%16 - 8) > 2?2:1))) + \\ \text{displacement}Y\%16 == 8?0:(((x^*\text{sub}W + \text{offset}X) \\ << 1) + 1)^*(((\text{distancement}Y > 8\&\& \\ \text{distancement}Y < 24)?(-1):1)^*(((\text{displacement}Y + 4) \\ \%16 <= 8\&\&(\text{displacement}Y + 4)\%16! = 0)?4:(\text{abs} \\ (\text{displacement}Y\%16 - 8) > 2?2:1))) \quad (8\text{-}3)$$

((($x^*$subW+offsetX)<<1)+1) represents a horizontal coordinate obtained by doubling the original horizontal coordinate of the sample, and ((($y^*$subH+offsetY)<<1)+1) represents a vertical coordinate obtained by doubling the original vertical coordinate of the sample. They have the same meanings as formula (8).

In case of displacementX %16==8, weightIdx=0. When displacementX %16 is not equal to 8, (((distancementX>8&&distancementX<24)?(−1):1)*(((displacementX+4)%16<=8&&(displacementX+4)%16!=0)?4:(abs(displacementX % 16−8)>2?2:1)) is used to obtain the first cosine value. Specifically, (distancementX>8&&distancementX<24)?(−1):1) is used to determine a sign of the first cosine value, and (((displacementX+4)%16<=8&&(displacementX+4)%16!=0)?4:(abs (displacementX %16−8)>2?2:1))) is used to determine a value of the first cosine value. When (displacementX+4) %16<=8&&(displacementX+4)%16!=0) is true, the first cosine value is 4. When (displacementX+4)%16<=8&& (displacementX+4)%16!=0) is false, and abs(displacementX %16−8)>2 is true, the first cosine value is 2. When (displacementX+4)%16<=8&&(displacementX+4)%16!=0) is false, and abs(displacementX %16−8)>2 is false, the first cosine value is 1.

In case of displacementY %16==8, weightIdx=0. When displacementY %16 is not equal to 8, (((distancementY>8&&distancementY<24)?(−1):1)*(((displacementY+4)%16<=8&&(displacementY+4)%16!=0)?4: (abs(displacementY % 16−8)>2?2:1)) is used to obtain the first sine value. Specifically, (distancementY>8&&distancementY<24)?(−1):1) is used to determine a sign of the first sine value, and (((displacementY+4)%16<=8&&(displacementY+4)%16!=0)?4:(abs (displacementY %16−8)>2?2:1))) is used to determine a value of the first sine value. When (displacementY+4) %16<=8&&(displacementY+4)%16!=0) is true, the first sine value is 4. When (displacementY+4)%16<=8&&(displacementY+4)%16!=0) is false, and abs(displacementY %16−8)>2 is true, the first sine value is 2. When (displacementY+4)%16<=8&&(displacementY+4)%16!=0) is false, and abs(displacementY %16−8)>2 is false, the first sine value is 1.

Through formula (8-3), a sign of the first cosine value is determined based on the cosine angle index information, and an absolute value of the first cosine value is calculated based on the cosine angle index information. A sign of the first sine value is determined based on the sine angle index information, and an absolute value of the first sine value is calculated based on the sine angle index information.

Formula (8-3) is equivalent to formula (8-4). Formula (8-4) is specifically as follows.

$$\text{weightIdx} = \text{displacement}X\%16 == 8?0:(((x^*\text{sub}W + \text{offset}X) << 1) + 1)^*((\text{displacement}Y > 16?(-1):1)^* \\ (((\text{displacement}X + 4)\%16 <= 8\&\&(\text{displace-} \\ \text{ment}X + 4)\%16! = 0)?4:(\text{abs}(\text{displacement}X\%16 - \\ 8) > 2?2:1))) + \text{displacement}Y\%16 == 8?0:(((x^*\text{sub}W + \\ \text{offset}X) << 1) + 1)^*((\text{displacement}X > 16?(-1):1)^* \\ (((\text{displacement}Y + 4)\%16 <= 8\&\& \\ (\text{displacement}Y + 4)\%16! = 0)?4:(\text{abs} \\ (\text{displacement}Y\%16 - 8) > 2?2:1))) \quad (8\text{-}4)$$

Like ((distancementX>8&&distancementX<24)?(−1):1) in formula (8-3), (displacementY>16?(−1):1) is used to determine the (plus/minus sign) of the first cosine value. Like ((distancementY>8&&distancementY<24)?(−1):1) in formula (8-3), (displacementX>16?(−1):1) used to determine the (plus/minus) sign of the first sine value. That is, the sign of the first cosine value is determined based on the sine angle index information, and the absolute value of the first cosine value is calculated based on the cosine angle index information. The sign of the first sine value is determined based on the cosine angle index information, and the absolute value of the first sine value is calculated based on the sine angle index information. The other parts are the same, and will not be elaborated herein.

Formulas (9) and (10) remain unchanged.

Similarly, when the MV storage related parameter is calculated, the motion index of the SB in the current block may be determined based on the updated angle mapping table.

The first cosine value and first sine value corresponding to the angle index information are determined by calculation without any angle mapping table. Formula (16) may be transformed to formulas (16-3) and (16-4).

$$\text{motionIdx} = \text{displacement}X\%16 == 8?0:(((4^*x\text{SbIdx} + \text{offset}X) << 1) + 5)^*(((\text{distancement}X > 8\&\&\text{dis-} \\ \text{tancement}X < 24)?(-1):1)^*(((\text{displacement}X + 4) \\ \%16 <= 8\&\&(\text{displacement}X + 4)\%16! = 0)?4:(\text{abs}$$

(displacement*X*%16−8)>2?2:1)))+
displacement*Y*%16−8?0:(((4**y*SbIdx+offset*Y*)
<<1)+5)*
(((distancement*Y*>8&&distancement*Y*<24)?(−1):
1)*(((displacement*Y*+4)%16<=8&&
(displacement*Y*+4)%16!=0)?4:(abs
(displacement*Y*%16−8)>2?2:1)))  (16-3)

(((4*xSbIdx+offsetX)<<1)+5) represents a horizontal coordinate obtained by doubling the original horizontal coordinate of the center sample of the SB, and (((4*ySbIdx+offsetY)<<1)+5) represents a vertical coordinate obtained by doubling the original vertical coordinate of the center sample of the SB. They have the same meanings as formula (16).

In case of displacementX %16==8, motionIdx=0. When displacementX %16 is not equal to 8, (((distancementX>8&&distancementX<24)?(−1):1)*(((displacementX+4)%16<=8&&(displacementX+4)%16!=0)?4:(abs(displacementX % 16−8)>2?2:1)) is used to obtain the first cosine value. Specifically, (distancementX>8&&distancementX<24)?(−1):1) is used to determine a sign of the first cosine value, and (((displacementX+4)%16<=8&&(displacementX+4)%16!=0)?4:(abs(displacementX %16−8)>2?2:1))) is used to determine a value of the first cosine value. When (displacementX+4)%16<=8&&(displacementX+4)%16!=0) is true, the first cosine value is 4. When (displacementX+4)%16<=8&&(displacementX+4)%16!=0) is false, and abs(displacementX %16−8)>2 is true, the first cosine value is 2. When (displacementX+4)%16<=8&&(displacementX+4)%16!=0) is false, and abs(displacementX %16−8)>2 is false, the first cosine value is 1.

In case of displacementY %16==8, motionIdx=0. When displacementY %16 is not equal to 8, (((distancementY>8&&distancementY<24)?(−1):1)*(((displacementY+4)%16<=8&&(displacementY+4)%16!=0)?4:(abs(displacementY % 16−8)>2?2:1)) is used to obtain the first sine value. Specifically, (distancementY>8&&distancementY<24)?(−1):1) is used to determine a sign of the first sine value, and (((displacementY+4)%16<=8&&(displacementY+4)%16!=0)?4:(abs(displacementY %16−8)>2?2:1))) is used to determine a value of the first sine value. When (displacementY+4)%16<=8&&(displacementY+4)%16!=0) is true, the first sine value is 4. When (displacementY+4)%16<=8&&(displacementY+4)%16!=0) is false, and abs(displacementY %16−8)>2 is true, the first sine value is 2. When (displacementY+4)%16<=8&&(displacementY+4)%16!=0) is false, and abs(displacementY %16−8)>2 is false, the first sine value is 1.

Formula (16-3) is equivalent to formula (16-4). Formula (16-4) is specifically as follows.

motionIdx=displacement*X*%16==8?0:(((4**x*SbIdx+
offset*X*)<<1)+5)*((displacement*Y*>16?(−1):1)*
(((displacement*Y*+4)%16<=8&&(displace-
ment*Y*+4)%16!=0)?4:(abs(displacement*Y*%16−
8)>2?2:1)))+displacement*Y*%16−8?0:
(((4**y*SbIdx+offset*Y*)<<1)+5)*
((displacement*X*>16?(−1):1)*(((displacement*Y*+
4)%16<=8&&(displacement*Y*+4)%16!=0)?4:(abs
(displacement*Y*%16−8)>2?2:1)))  (16-4)

Like ((distancementX>8&&distancementX<24)?(−1):1) in formula (16-3), (displacementY>16?(−1):1) is used to determine the sign of the first cosine value. Like ((distancementY>8&&distancementY<24)?(−1):1) in formula (16-3), (displacementX>16?(−1):1) is used to determine the sign of the first sine value. The other parts are the same, and will not be elaborated herein. Formulas (17) and (18) remain unchanged.

In the embodiment of the disclosure, a fifth mode of determining the first cosine value and the first sine value is also provided.

In the fifth mode, the first cosine value and first sine value corresponding to the angle index information are calculated by use of a second calculation strategy based on the angle index information of the current block. First cosine values and first sine values calculated based on different angle index information being not all even numbers.

That is, in the fifth mode, the first cosine value and first sine value corresponding to the angle index information are calculated by use of a calculation strategy different that in the fourth mode without any angle mapping table. Formula (8) may be transformed to formulas (8-5) and (8-6).

weightIdx=displacement*X*%16==8?0:(((*x**subW*+
offset*X*)<<1)+1)*
(((distancement*X*>8&&distancement*X*<24)?(−1):
1)<<clip(0,2(abs(displacement*X*%16−8)−
1)>>1))+displacement*Y*%16==8?0:(((*x**subW*+
offset*X*)<<1)+1)*
(((distancement*Y*>8&&distancement*Y*<24)?(−1):
1)<<clip(0,2(abs(displacement*Y*%16−8)−1)>>1))  (8-5)

(((x*subW+offsetX)<<1)+1) represents a horizontal coordinate obtained by doubling the original horizontal coordinate of the sample, and (((y*subH+offsetY)<<1)+1) represents a vertical coordinate obtained by doubling the original vertical coordinate of the sample. They have the same meanings as formula (8).

In case of displacementX %16==8, weightIdx=0. When displacementX %16 is not equal to 8, (((distancementX>8&&distancementX<24)?(−1):1)<<clip(0,2 (abs(displacementX %16−8)−1)>>1)) is used to obtain the first cosine value. Specifically, (distancementX>8&&distancementX<24)?(−1):1) is used to determine a sign of the first cosine value, and <<clip(0,2 (abs(displacementX %16−8)−1)>>1)) represents that determined +1 or −1 is shifted leftwards by 0 bit, 1 bit, or 2 bits to obtain corresponding first cosine values 4, 2, 1, −1, −2, or −4.

In case of displacementY %16==8, weightIdx=0. When displacementY %16 is not equal to 8, (((distancementY>8&&distancementY<24)?(−1):1)<<clip(0,2 (abs(displacementY %16−8)−1)>>1)) is used to obtain the first sine value. Specifically, (distancementY>8&&distancementY<24)?(−1):1) is used to determine a sign of the first sine value, and <<clip(0,2 (abs(displacementY %16−8)−1)>>1)) represents that determined +1 or −1 is shifted leftwards by 0 bit, 1 bit, or 2 bits to obtain corresponding first sine values 4, 2, 1, −1, −2, or −4.

Formula (8-5) is equivalent to formula (8-6). Formula (8-6) is specifically as follows.

weightIdx=displacement*X*%16==8?0:(((*x**subW*+
offset*X*)<<1)+1)*((displacement*Y*>16?(−1):1)
<<clip(0,2(abs(displacement*X*%16−8)−1)>>1))+
displacement*Y*%16==8?0:(((*x**subW*+offset*X*)
<<1)+1)*((displacement*X*>16?(−1):1)<<clip(0,2
(abs(displacement*Y*%16−8)−1)>>1))  (8-6)

Like ((distancementX>8&&distancementX<24)?(−1):1) in formula (8-5), (displacementY>16?(−1):1) is used to determine the sign of the first cosine value. Like ((distancementY>8&&distancementY<24)?(−1):1) in formula (8-5), (displacementX>16?(−1):1) is used to determine the of the first sine value. The other parts are the same, and will not be elaborated herein.

Formulas (9) and (10) remain unchanged.

Similarly, when the MV storage related parameter is calculated, the motion index of the SB in the current block may be determined based on the updated angle mapping table.

The first cosine value and first sine value corresponding to the angle index information are calculated by use of a calculation strategy different that in the fourth mode without any angle mapping table. Formula (16) may be transformed to formulas (16-5) and (16-6).

$$\text{motionIdx} = \text{displacement}X\%16 == 8?0:(((4*x\text{SbIdx} + \text{offset}X) << 1) + 5)* \\ (((\text{distancement}X > 8 \&\& \text{distancement}X < 24)?(-1): \\ 1) << \text{clip}(0,2(\text{abs}(\text{displacement}X\%16-8) - \\ 1)) >> 1)) + \text{displacement}Y\%16 == 8?0:(((4*y\text{SbIdx} + \text{offset}Y) << 1) + 5)* \\ (((\text{distancement}Y > 8 \&\& \text{distancement}Y < 24)?(-1): \\ 1) << \text{clip}(0,2(\text{abs}(\text{displacement}X\%16-8) - 1) >> 1)) \quad (16\text{-}5)$$

$(((4*x\text{SbIdx}+\text{offsetX})<<1)+5)$ represents a horizontal coordinate obtained by doubling the original horizontal coordinate of the center sample of the SB, and $(((4*y\text{SbIdx}+\text{offsetY})<<1)+5)$ represents a vertical coordinate obtained by doubling the original vertical coordinate of the center sample of the SB. They have the same meanings as formula (16).

In case of displacementX %16==8, motionIdx=0. When displacementX %16 is not equal to 8, $(((\text{distancementX}>8\&\&\text{distancementX}<24)?(-1):1)<<\text{clip}(0,2 (\text{abs}(\text{displacementX} \%16-8)-1)>>1))$ is used to obtain the first cosine value. Specifically, $(\text{distancementX}>8\&\&\text{distancementX}<24)?(-1):1$ is used to determine a sign of the first cosine value, and $<<\text{clip}(0,2 (\text{abs}(\text{displacementX} \%16-8)-1)>>1))$ represents that determined +1 or −1 is shifted leftwards by 0 bit, 1 bit, or 2 bits to obtain corresponding first cosine values 4, 2, 1, −1, −2, or −4.

In case of displacementY %16==8, motionIdx=0. When displacementY %16 is not equal to 8, $(((\text{distancementY}>8\&\&\text{distancementY}<24)?(-1):1)<<\text{clip}(0,2 (\text{abs}(\text{displacementY} \%16-8)-1)>>1))$ is used to obtain the first sine value. Specifically, $(\text{distancementY}>8\&\&\text{distancementY}<24)?(-1):1$ is used to determine a sign of the first sine value, and $<<\text{clip}(0,2 (\text{abs}(\text{displacementY} \%16-8)-1)>>1))$ represents that determined +1 or −1 is shifted leftwards by 0 bit, 1 bit, or 2 bits to obtain corresponding first sine values 4, 2, 1, −1, −2, or −4.

Formula (16-5) is equivalent to formula (16-6). Formula (16-6) is specifically as follows.

$$\text{motionIdx} = \text{displacementX} \%16 == 8?0:(((4*x\text{SbIdx} + \text{offset}X) << 1) + 5)*((\text{displacement}Y > 16?(-1):1) \\ << \text{clip}(0,2(\text{abs}(\text{displacement}X\%16-8)-1)>>1)) + \\ \text{displacement}Y\%16 == 8?0:(((4*y\text{SbIdx} + \text{offset}Y) \\ <<1)+5)*((\text{displacement}X > 16?(-1):1)<<\text{clip}(0,2 \\ (\text{abs}(\text{displacement}Y\%16-8)-1)>>1)) \quad (16\text{-}6)$$

Like $((\text{distancementX}>8\&\&\text{distancementX}<24)?(-1):1)$ in formula (16-5), $(\text{displacementY}>16?(-1):1)$ is used to determine the sign of the first cosine value. Like $((\text{distancementY}>8\&\&\text{distancementY}<24)?(-1):1)$ in formula (16-5), $(\text{displacementX}>16?(-1):1)$ is used to determine the sign of the first sine value. The other parts are the same, and will not be elaborated herein.

In the embodiment of the disclosure, a sixth mode of determining the first cosine value and the first sine value is also provided.

In the sixth mode, the first cosine value and first sine value corresponding to the angle index information are calculated by use of a third calculation strategy based on the angle index information of the current block. First cosine values and first sine values calculated based on different angle index information are not all even numbers.

That is, in the sixth mode, the first cosine value and first sine value corresponding to the angle index information are calculated by use of a calculation strategy different those in the fourth mode and the fifth mode without any angle mapping table. Formula (8) may be transformed to formulas (8-7), (8-8), and (8-9).

$$\text{weightIdx} = (((x*\text{sub}W+\text{offsetX})<<1)+1)* \\ (((\text{distancementX}>8\&\&\text{distancementX}<24)?(-1): \\ 1)*((\text{abs}((\text{displacementX}\%16)-8)+1)>>1)) + \\ (((y*\text{sub}H+\text{offsetY})<<1)+1)* \\ (((\text{distancementY}>8\&\&\text{distancementY}<24)<16? \\ (-1):1)*((\text{abs}((\text{displacementY}\%16)-8)+1)>>1)). \quad (8\text{-}7)$$

$(((x*\text{subW}+\text{offsetX})<<1)+1)$ represents a horizontal coordinate obtained by doubling the original horizontal coordinate of the sample, and $(((y*\text{subH}+\text{offsetY})<<1)+1)$ represents a vertical coordinate obtained by doubling the original vertical coordinate of the sample. They have the same meanings as formula (8).

$(((\text{distancementX}>8\&\&\text{distancementX}<24)?(-1):1)*((\text{abs}((\text{displacementX} \%16)-8)+1)>>1))$ is used to obtain the first cosine value. Specifically, $(\text{distancementX}>8\&\&\text{distancementX}<24)?(-1):1$ is used to determine a sign of the first cosine value, and $((\text{abs}((\text{displacementX} \%16)-8)+1)>>1))$ is used to determine a value of the first cosine value. The value of the first cosine value includes 4, 3, 2, 1, and 0.

$(((\text{distancementY}>8\&\&\text{distancementY}<24)?(-1):1)*((\text{abs}((\text{displacementY} \%16)-8)+1)>>1))$ is used to obtain the first sine value. Specifically, $(\text{distancementY}>8\&\&\text{distancementY}<24)?(-1):1$ is used to determine a sign of the first sine value, and $((\text{abs}((\text{displacementY} \%16)-8)+1)>>1))$ is used to determine a value of the first sine value. The value of the first sine value includes 4, 3, 2, 1, and 0.

Formula (8-7) is equivalent to formula (8-8). Formula (8-8) is specifically as follows.

$$\text{weightIdx} = (((x*\text{sub}W+\text{offsetX})<<1)+1)*((\text{displacement}Y>=16)?(-1):1)*((\text{abs}((\text{displacementX} \\ \%16)-8)+1)>>1)) + (((y*\text{sub}H+\text{offsetY})<<1)+1)* \\ (((\text{displacement}X<16)?(-1):1)*((\text{abs}((\text{displacement}Y\%16)-8)+1)>>1)) \quad (8\text{-}8)$$

Like $((\text{distancementX}>8\&\&\text{distancementX}<24)?(-1):1)$ in formula (8-7), $(\text{displacementY}>16?(-1):1)$ is used to determine the sign of the first cosine value. Like $((\text{distancementY}>8\&\&\text{distancementY}<24)?(-1):1)$ in formula (8-7), $(\text{displacementX}>16?(-1):1)$ is used to determine the sign of the first sine value. The other parts are the same, and will not be elaborated herein.

Formula (8-7) is equivalent to formula (8-9). Formula (8-9) is specifically as follows.

$$\text{weightIdx} = (((x*\text{sub}W+\text{offsetX})<<1)+1)* \\ ((\text{displacement}Y\&0x10)?(-1):1)* \\ ((\text{displacement}X\&0x08)?((\sim \\ (\text{displacement}X\&0x07)+2)>>1): \\ (((\text{displacement}X\&0x07)+1)>>1)) + (((y*\text{sub}H+ \\ \text{offset}Y)<<1)+1)*((\text{displacement}X\&0x10?1:(-1)) \\ *((\text{displacement}Y\&0x08)?((\sim \\ (\text{displacement}Y\&0x07)+2)>>1): \\ (((\text{displacement}Y\&0x07)+1)>>1)). \quad (8\text{-}9)$$

Like $((\text{distancementX}>8\&\&\text{distancementX}<24)?(-1):1)$ in formula (8-7), $((\text{displacementY}\&0x10)?(-1):1)$ is used to determine the sign of the first cosine value. Like ((distancementY>8&&distancementY<24)?(−1): 1) in formula (8-7), ((displacementX&0x10?1:(−1)) is used to determine the sign of the first sine value.

((displacementX&0x08)?((~(displacementX&0x07)+2)>>1): (((displacementX&0x07)+1)>>1)) is used to determine the value of the first cosine value. The value of the first cosine value includes 4, 3, 2, 1, and 0.

((displacementY&0x08)?((~(displacementY&0x07)+2)>>1):(((displacementY &0x07)+1)>>1)) is used to determine the value of the first sine value. The value of the first sine value includes 4, 3, 2, 1, and 0.

Formulas (9) and (10) remain unchanged.

Similarly, when the MV storage related parameter is calculated, the motion index of each SB in the current block may be determined based on the updated angle mapping table.

That is, in the sixth mode, the first cosine value and first sine value corresponding to the angle index information are calculated by use of a calculation strategy different those in the fourth mode and the fifth mode without any angle mapping table. Formula (16) may be transformed to formulas (16-7), (16-8), and (16-9).

$$\text{motionIdx} = 4(4*x\text{SbIdx}+\text{offset}X)<<1)+5)* \\ (((\text{distancement}X>8\&\&\text{distancement}X<24)?(-1): \\ 1)*((\text{abs}((\text{displacement}X\%16)-8)+1)>>1))+ \\ (((4*y\text{SbIdx}+\text{offset}Y)<<1)+1)* \\ (((\text{distancement}Y>8\&\&\text{distancement}Y<24)<16? \\ (-1):1)*((\text{abs}((\text{displacement}Y\%16)-8)+1)>>1)) \quad (16\text{-}7)$$

(((4*xSbIdx+offsetX)<<1)+5) represents a horizontal coordinate obtained by doubling the original horizontal coordinate of the center sample of the SB, and (((4*ySbIdx+offsetY)<<1)+5) represents a vertical coordinate obtained by doubling the original vertical coordinate of the center sample of the SB. They have the same meanings as formula (16).

(((distancementX>8&&distancementX<24)?(−1):1)* ((abs((displacementX %16)−8)+1)>>1)) is used to obtain the first cosine value. Specifically, (distancementX>8&&distancementX<24)?(−1):1) is used to determine a sign of the first cosine value, and ((abs((displacementX %16)−8)+1)>>1)) is used to determine a value of the first cosine value. The value of the first cosine value includes 4, 3, 2, 1, and 0.

(((distancementY>8&&distancementY<24)?(−1):1)* ((abs((displacementY %16)−8)+1)>>1)) is used to obtain the first sine value. Specifically, (distancementY>8&&distancementY<24)?(−1):1) is used to determine a sign of the first sine value, and ((abs((displacementY %16)−8)+1)>>1)) is used to determine a value of the first sine value. The value of the first sine value includes 4, 3, 2, 1, and 0.

Formula (16-7) is equivalent to formula (16-8). Formula (16-8) is specifically as follows.

$$\text{motionIdx} = 4(4*x\text{SbIdx}+\text{offset}X)<<1)+5)*((\text{displacement}Y>16)?(-1):1)*((\text{abs}((\text{displacement}X\%16)-8)+1)>>1))+(((4*y\text{SbIdx}+\text{offset}Y)* \\ (((\text{displacement}X<16)?(-1):1)*((\text{abs} \\ ((\text{displacement}Y\%16)-8)+1)>>1)) \quad (16\text{-}8)$$

Like ((distancementX>8&&distancementX<24)?(−1):1) in formula (16-7), (displacementY>16?(−1):1) is used to determine the sign of the first cosine value. Like ((distancementY>8&&distancementY<24)?(−1):1) in formula (16-7), (displacementX>16?(−1):1) is used to determine the sign of the first sine value. The other parts are the same, and will not be elaborated herein.

Formula (16-7) is equivalent to formula (16-9). Formula (16-9) is specifically as follows.

$$\text{motionIdx} = 4(4*x\text{SbIdx}+\text{offset}X)<<1)+5)* \\ ((\text{displacement}Y\&0x10)?(-1):1)* \\ ((\text{displacement}X\&0x08)?((\sim \\ (\text{displacement}X\&0x07)+2)>>1): \\ (((\text{displacement}X\&0x07)+1)>>1))+(((4*y\text{SbIdx}+ \\ \text{offset}Y)*((\text{displacement}X\&0x10?1:(-1))* \\ ((\text{displacement}Y\&0x08)?((\sim \\ (\text{displacement}Y\&0x07)+2)>>1): \\ (((\text{displacement}Y\&0x07)+1)>>1)). \quad (16\text{-}9)$$

Like ((distancementX>8&&distancementX<24)?(−1):1) in formula (16-7), ((displacementY&0x10)?(−1):1) is used to determine the sign of the first cosine value. Like ((distancementY>8&&distancementY<24)?(−1): 1) in formula (16-7), ((displacementX&0x10?1:(−1)) is used to determine the sign of the first sine value.

((displacementX&0x08)?((~(displacementX&0x07)+2)>>1): (((displacementX&0x07)+1)>>1)) is used to determine the value of the first cosine value. The value of the first cosine value includes 4, 3, 2, 1, and 0.

((displacementY&0x08)?((~(displacementY&0x07)+2)>>1):(((displacementY &0x07)+1)>>1)) is used to determine the value of the first sine value. The value of the first sine value includes 4, 3, 2, 1, and 0.

The mapping relationship between the angle index information and the first cosine value as well as the first sine value, obtained by use of the third calculation strategy in the sixth mode, is equivalent to that in Table 7.

TABLE 7

| | idx | | | | | | | | | | | |
|---|---|---|---|---|---|---|---|---|---|---|---|---|
| | 0 | 2 | 3 | 4 | 5 | 6 | 8 | 10 | 11 | 12 | 13 | 14 |
| disLut[idx] | 4 | 3 | 3 | 2 | 2 | 1 | 0 | −1 | −2 | −2 | −3 | −3 |
| | idx | | | | | | | | | | | |
| | 16 | 18 | 19 | 20 | 21 | 22 | 24 | 26 | 27 | 28 | 29 | 30 |
| disLut[idx] | −4 | −3 | −3 | −2 | −2 | −1 | 0 | 1 | 2 | 2 | 3 | 3 |

With the adoption of the fourth mode to the sixth mode, the operation of constructing the angle mapping table is eliminated, and the weight indexes corresponding to the angle information are calculated directly, so that the obtained weight indexes are not all even numbers. Therefore, on the basis of not changing the coding/decoding performance, the weight index bit overhead and the storage bit overhead of the angle mapping table may be reduced, and the storage efficiency may be improved.

In the disclosure, the calculation of the weight values is simplified, and the power reduction process is performed on each item in the original angle mapping table (i.e., Table 4), reducing bits needed for storing intermediate calculation results. It can be seen from Table 7 that each item in the angle mapping table is reduced by one bit, the weight index weightIdx is reduced by one bit, the extended weight index value weightIdxL is reduced by one bit, and the motion index information motionIdx is also reduced by one bit.

Figure 14:
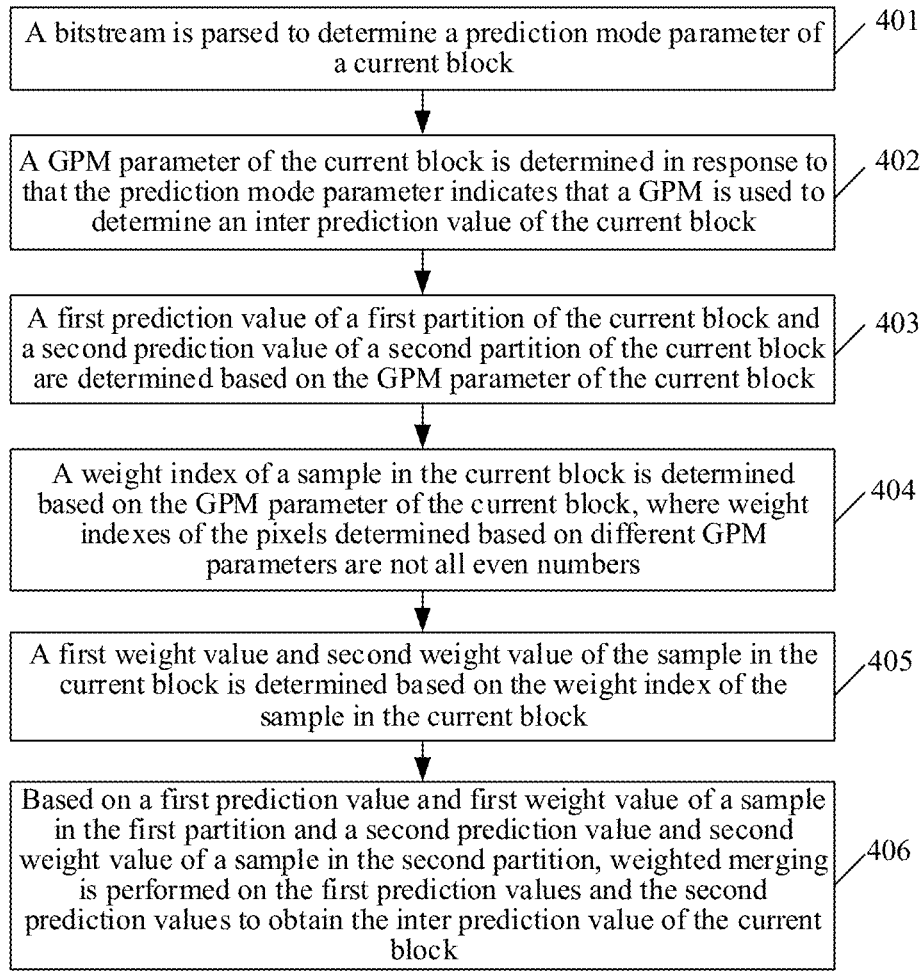
FIG. 14 is a second schematic flowchart of an intra prediction method according to an embodiment of the disclosure.

FIG. 14 is a second flowchart of an inter prediction method according to an embodiment of the disclosure. The method is applied to a decoder, and as shown in FIG. 14, includes the following operations.

In 401, a bitstream is parsed to determine a prediction mode parameter of a current block.

In 402, a GPM parameter of the current block is determined in response to that the prediction mode parameter indicates that a GPM is used to determine an inter prediction value of the current block.

In 403, a first prediction value of a first partition of the current block and a second prediction value of a second partition of the current block are determined based on the GPM parameter of the current block.

In 404, a weight index of a sample in the current block is determined based on the GPM parameter of the current block. Weight indexes of the samples determined based on different GPM parameters are not all even numbers.

In 405, a first weight value and second weight value of the sample in the current block is determined based on the weight index of the sample in the current block.

In 406, based on a first prediction value and first weight value of a sample in the first partition and a second prediction value and second weight value of a sample in the second partition, weighted merging is performed on the first prediction values and the second prediction values to obtain the inter prediction value of the current block.

In the embodiment of the disclosure, the GPM parameter of the current block may be acquired or determined in response to that the prediction mode parameter indicates that the GPM is used to determine the inter prediction value of the current block.

Specifically, the GPM parameter of the current block includes angle index information of a partitioning line of the current block and size information of the current block, and may further include stride index information of the partitioning line of the current block, etc. The decoder parses the bitstream to obtain the angle index information of the partitioning line of the current block, compensation information, the size information of the current block, and other information.

In the embodiment of the disclosure, the GPM parameter of the current block includes size information and angle index information of the current block. The operation that the weight index of each sample in the current block is determined based on the GPM parameter of the current block includes the following operations. Position information of the sample in the current block is determined based on the size information of the current block. A first cosine value and first sine value corresponding to the angle index information are determined by use of a preset determination strategy based on the angle index information of the current block. First cosine values and first sine values corresponding to different angle index information are not all even numbers. The weight value of the sample in the current block is determined based on the first cosine value and the first sine value in combination with the position information of the sample in the current block respectively.

In the embodiment of the disclosure, the operation that the first cosine value and first sine value corresponding to the angle index information are determined by use of the preset determination strategy based on the angle index information of the current block includes the following operations. Cosine angle index information and sine angle index information of the current block are determined based on the angle index information of the current block. The first cosine value is acquired from a preset angle mapping table based on the cosine angle index information. The first sine value is acquired from the preset angle mapping table based on the sine angle index information. Here, first cosine values and first sine values corresponding to different angle index information in the angle mapping table are not all even numbers.

In the embodiment of the disclosure, before the operation that the first cosine value is acquired from the preset angle mapping table based on the cosine angle index information, the method further includes the following operations. Second cosine values corresponding to M angle index information are obtained based on the M angle index information, M being even. A power reduction process is performed on the second cosine values corresponding to the M angle index information to obtain first cosine values corresponding to the M angle index information. The angle mapping table is constructed by use of the M angle index information and the corresponding first cosine values.

In the embodiment of the disclosure, the first cosine values corresponding to the M angle index information are cyclically distributed based on a preset arrangement sequence. The operation that the angle mapping table is constructed by use of the M angle index information and the corresponding first cosine values includes the following operations. The first cosine values corresponding to the first M/2 angle index information are acquired from the M angle index information based on the M angle index information and the corresponding first cosine values. The angle mapping table is constructed by use of the first M/2 angle index information and the corresponding first cosine values.

In the embodiment of the disclosure, the first cosine values corresponding to the M angle index information are cyclically distributed based on a preset arrangement sequence. The operation that the angle mapping table is constructed by use of the M angle index information and the corresponding first cosine values includes the following operations. The first cosine values corresponding to the first M/4+1 angle index information are acquired from the M angle index information based on the M angle index information and the corresponding first cosine values. The angle mapping table is constructed by use of the first M/4+1 angle index information and the corresponding first cosine values.

In the embodiment of the disclosure, the operation that the first cosine value and first sine value corresponding to the angle index information are determined by use of the preset determination strategy based on the angle index information of the current block includes that: the first cosine value and first sine value corresponding to the angle index information are calculated by use of a preset calculation strategy based on the angle index information of the current block. First cosine values and first sine values calculated based on different angle index information are not all even numbers.

Specifically, a sign of the first cosine value is determined based on the cosine angle index information, and an absolute value of the first cosine value is calculated based on the cosine angle index information. A sign of the first sine value is determined based on the sine angle index information, and an absolute value of the first sine value is calculated based on the sine angle index information.

Alternatively, the sign of the first cosine value is determined based on the sine angle index information, and the absolute value of the first cosine value is calculated based on the cosine angle index information. The sign of the first sine value is determined based on the cosine angle index information, and the absolute value of the first sine value is calculated based on the sine angle index information.

In the embodiment of the disclosure, the GPM parameter of the current block includes size information and angle index information of the current block. The operation that the weight index of each sample in the current block is determined based on the GPM parameter of the current block includes the following operations. Position information of a center sample of each SB in the current block is determined based on the size information of the current block. A first cosine value and first sine value corresponding to the angle index information are determined by use of a preset determination strategy based on the angle index information of the current block. First cosine values and first sine values corresponding to different angle index information are not all even numbers. The weight value of the center sample of the SB in the current block is determined based on the first cosine value and the first sine value in combination with the position information of the center sample of the SB in the current block respectively. The method further includes the following operations. The weight index of the center sample of the SB in the current block is determined as a motion index of the SB in the current block. A storage type of motion information of the SB in the current block is determined based on motion index information of the SB in the current block. Here, the storage type includes storage of unidirectional motion information or storage of bidirectional motion information.

In the embodiment of the disclosure, there are six modes for determining the first cosine value and first sine value corresponding to the angle index information by use of the preset determination policy based on the angle index information of the current block.

Cosine angle index information and sine angle index information of the current block are determined based on the angle index information of the current block. The first cosine value is acquired from a preset angle mapping table based on the cosine angle index information. The first sine value is acquired from the preset angle mapping table based on the sine angle index information. First cosine values and first sine values corresponding to different angle index information in the angle mapping table are not all even numbers.

That is, the first cosine value and first sine value corresponding to weight index information are acquired according to the pre-constructed angle mapping table. In the embodiment of the disclosure, three specific modes for constructing the angle mapping table are provided. The modes have been described in detail at the encoder side and will not be elaborated herein.

In the embodiment of the disclosure, three calculation strategies are also provided to calculate the first cosine value and first sine value corresponding to the weight index information, specifically a first calculation strategy, a second calculation strategy, and a third calculation strategy. The calculation strategies have been described in detail at the encoder side, and will not be elaborated herein.

In some embodiments, the method further includes the following operations. A motion information candidate list is constructed, and the bitstream is parsed to determine first index information corresponding to motion information of the first partition of the current block and second index information corresponding to motion information of the second partition of the current block from the motion information candidate list. The motion information of the first partition is acquired from the motion information candidate list based on the first index information. The motion information of the second partition is acquired from the motion information candidate list based on the second index information. The first prediction value of the first partition is calculated by using the motion information of the first partition, and the second prediction value of the second partition is calculated by using the motion information of the second partition. Weighted merging is performed on the first prediction value and the second prediction value to obtain the inter prediction value of the current block.

Specifically, the bitstream is parsed. When the number of candidate items in the motion information candidate list is greater than 2, the first index information corresponding to the motion information of the first partition and the second index information corresponding to the motion information of the second partition are acquired from the motion information candidate list.

When the number of candidate items in the motion information candidate list is equal to 2, the first index information corresponding to the motion information of the first partition or the second index information corresponding to the motion information of the second partition is acquired from the motion information candidate list.

In the embodiment of the disclosure, the decoder may complete the weighted merging of samples in the current block based on a product of a first prediction value and first weight value of each sample plus a product of a second prediction value and second weight value of each corresponding sample, thereby obtaining the inter prediction value of the current block.

In practical applications, the decoder parses the bitstream to obtain the first index information of the first partition and the second index information of the second partition, and then determines, based on the index information, the motion information of each partition from the motion information candidate list constructed by the decoder. The decoder performs duplicate checking and deduplicating operations on the merge list to construct the motion information candidate list through the same method as the encoder. The other inter prediction processes of the decoder are the same as those of the encoder, and will not be elaborated herein.

With the above-mentioned solution, when the decoder calculates weight indexes of samples during inter prediction, a power reduction process may be performed by use of a preset calculation strategy during the calculation of the weight indexes, so that the obtained weight indexes are not all even numbers. Therefore, on the basis of not changing the coding/decoding performance, the problem in the existing solution that intermediate index data includes redundant bits is solved, the bit overhead may be reduced, and the storage efficiency may be improved.

Figure 15:
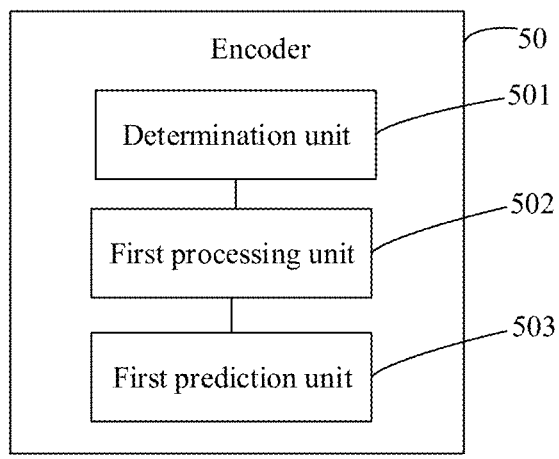
FIG. 15 is a first composition structure diagram of an encoder according to an embodiment of the disclosure.

The embodiments of the disclosure provide an encoder. FIG. 15 is a first composition structure diagram of an encoder according to an embodiment of the disclosure. As shown in FIG. 15, the encoder 50 includes a determination unit 501, a first processing unit 502, and a first prediction unit 503.

The determination unit 501 is configured to determine a prediction mode parameter of a current block.

The first processing unit 502 is configured to determine a GPM parameter of the current block in response to that the prediction mode parameter indicates that a GPM is used to determine an inter prediction value of the current block, and determine a first prediction value of a first partition of the current block and a second prediction value of a second partition of the current block based on the GPM parameter of the current block.

The first processing unit 502 is further configured to determine a weight index of a sample in the current block based on the GPM parameter of the current block, weight indexes of the samples determined based on different GPM parameters being not all even numbers, and determine a first weight value and a second weight value of the sample in the current block based on the weight index of the sample in the current block.

The first prediction unit 503 is configured to perform, based on a first prediction value and first weight value of a sample in the first partition and a second prediction value and second weight value of a sample in the second partition, weighted merging on the first prediction values and the second prediction values to obtain the inter prediction value of the current block.

In some embodiments of the disclosure, the GPM parameter of the current block includes size information and angle index information of the current block.

The first processing unit 502 is specifically configured to determine position information of the sample in the current block based on the size information of the current block, determine a first cosine value and a first sine value corresponding to the angle index information by use of a preset determination strategy based on the angle index information of the current block, first cosine values and first sine values corresponding to different angle index information being not all even numbers, and determine the weight value of the sample in the current block based on the first cosine value and the first sine value in combination with the position information of the sample in the current block respectively.

In some embodiments of the disclosure, the first processing unit 502 is specifically configured to determine cosine angle index information and sine angle index information of the current block based on the angle index information of the current block, acquire the first cosine value from a preset angle mapping table based on the cosine angle index information, and acquire the first sine value from the preset angle mapping table based on the sine angle index information. First cosine values and first sine values corresponding to different angle index information in the angle mapping table are not all even numbers.

In some embodiments of the disclosure, the first processing unit 502 is specifically configured to obtain second cosine values corresponding to M angle index information based on the M angle index information, M being even, perform a power reduction process on the second cosine values corresponding to the M angle index information to obtain first cosine values corresponding to the M angle index information, and construct the angle mapping table by using the M angle index information and the corresponding first cosine values.

In some embodiments of the disclosure, the first cosine values corresponding to the M angle index information are cyclically distributed based on a preset arrangement sequence.

The first processing unit 502 is specifically configured to acquire the first cosine values corresponding to the first M/2 angle index information from the M angle index information based on the M angle index information and the corresponding first cosine values, and construct the angle mapping table by use of the first M/2 angle index information and the corresponding first cosine values.

In some embodiments of the disclosure, the first cosine values corresponding to the M angle index information are cyclically distributed based on a preset arrangement sequence.

The first processing unit 502 is specifically configured to acquire the first cosine values corresponding to the first M/4+1 angle index information from the M angle index information based on the M angle index information and the corresponding first cosine values, and construct the angle mapping table by use of the first M/4+1 angle index information and the corresponding first cosine values.

In some embodiments of the disclosure, the first processing unit 502 is specifically configured to calculate the first cosine value and first sine value corresponding to the angle index information by use of a preset calculation strategy based on the angle index information of the current block. First cosine values and first sine values calculated based on different angle index information being not all even numbers.

In some embodiments of the disclosure, the GPM parameter of the current block includes size information and angle index information of the current block.

The first processing unit 502 is specifically configured to determine position information of a center sample of each SB in the current block based on the size information of the current block, determine a first cosine value and first sine value corresponding to the angle index information by use of a preset determination strategy based on the angle index information of the current block, first cosine values and first sine values corresponding to different angle index information being not all even numbers, and determine a weight value of the center sample of the SB in the current block based on the first cosine value and the first sine value in combination with the position information of the center sample of the SB in the current block respectively.

The first processing unit 502 is further configured to determine the weight index of the center sample of the SB in the current block as a motion index of the SB in the current block, and determine a storage type of motion information of the SB in the current block based on motion index information of the SB in the current block. The storage type includes storage of unidirectional motion information or storage of bidirectional motion information.

In some embodiments, the encoder 50 further includes a write unit, configured to write the angle index information of the current block to a bitstream.

Figure 16:
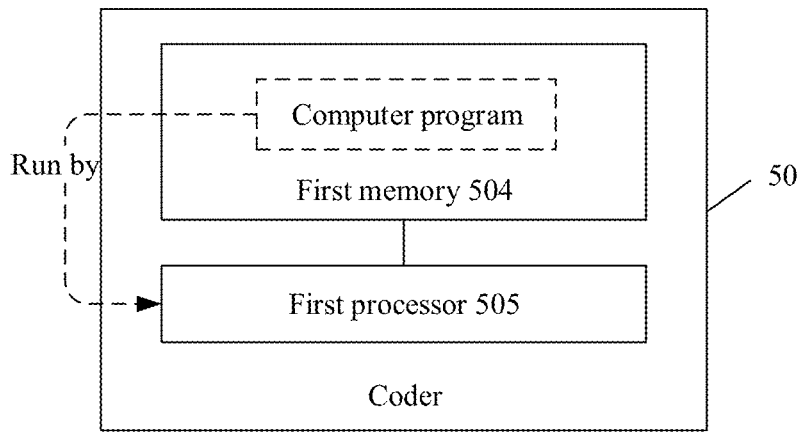
FIG. 16 is a second composition structure diagram of an encoder according to an embodiment of the disclosure.

In practical applications, the embodiments of the disclosure also provide an encoder. FIG. 16 is a second composition structure diagram of an encoder according to an embodiment of the disclosure. As shown in FIG. 16, the encoder 50 includes a first memory 504 and a first processor 505.

The first memory 504 stores a computer program capable of running in the first processor 505. The first processor 505 executes the program to implement the inter prediction method at an encoder side.

With the above-mentioned solution, when the encoder calculates weight indexes of samples during inter prediction, a power reduction process may be performed by use of a preset calculation strategy during the calculation of the weight indexes, so that the obtained weight indexes are not all even numbers. Therefore, on the basis of not changing the coding/decoding performance, the problem in the existing solution that intermediate index data includes redundant bits is solved, the bit overhead may be reduced, and the storage efficiency may be improved.

Figure 17:
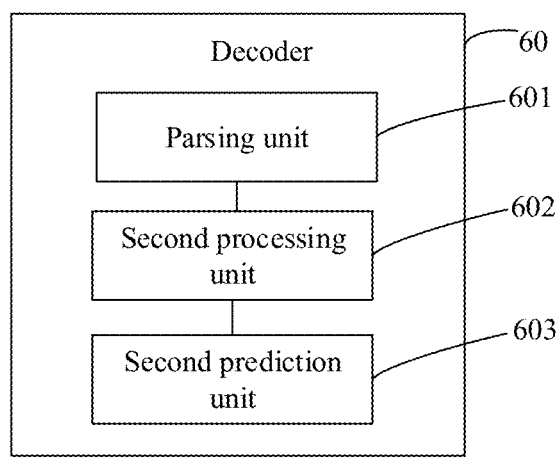
FIG. 17 is a first composition structure diagram of a decoder according to an embodiment of the disclosure.

The embodiments of the disclosure provide a decoder. FIG. 17 is a first composition structure diagram of a decoder based on an embodiment of the disclosure. As shown in FIG. 17, the decoder 60 includes a parsing unit 601, a second processing unit 602, and a second prediction unit 603.

The parsing unit 601 is configured to parse a bitstream to determine a prediction mode parameter of a current block.

The second processing unit 602 is configured to determine a GPM parameter of the current block in response to that the prediction mode parameter indicates that a GPM is used to determine an inter prediction value of the current block, and determine a first prediction value of a first partition of the current block and a second prediction value of a second partition of the current block based on the GPM parameter of the current block.

The second processing unit 602 is further configured to determine a weight index of a sample in the current block based on the GPM parameter of the current block, weight indexes of the samples determined based on different GPM parameters being not all even numbers, and determine a first weight value and second weight value of the sample in the current block based on the weight index of the sample in the current block.

The second prediction unit 603 is further configured to perform, based on a first prediction value and first weight value of a sample in the first partition and a second prediction value and second weight value of a sample in the second partition, weighted merging on the first prediction values and the second prediction values to obtain the inter prediction value of the current block.

In some embodiments of the disclosure, the GPM parameter of the current block includes size information and angle index information of the current block.

The second processing unit 602 is specifically configured to determine position information of the sample in the current block based on the size information of the current block, determine a first cosine value and first sine value corresponding to the angle index information by use of a preset determination strategy based on the angle index information of the current block, first cosine values and first sine values corresponding to different angle index information being not all even numbers, and determine the weight value of the sample in the current block based on the first cosine value and the first sine value in combination with the position information of the sample in the current block respectively.

In some embodiments of the disclosure, the second processing unit 602 is specifically configured to determine cosine angle index information and sine angle index information of the current block based on the angle index information of the current block, acquire the first cosine value from a preset angle mapping table based on the cosine angle index information, and acquire the first sine value from the preset angle mapping table based on the sine angle index information. First cosine values and first sine values corresponding to different angle index information in the angle mapping table are not all even numbers.

In some embodiments of the disclosure, the second processing unit 602 is specifically configured to obtain second cosine values corresponding to M angle index information based on the M angle index information, M being even, perform a power reduction process on the second cosine values corresponding to the M angle index information to obtain first cosine values corresponding to the M angle index information, and construct the angle mapping table by use of the M angle index information and the corresponding first cosine values.

In some embodiments of the disclosure, the first cosine values corresponding to the M angle index information are cyclically distributed based on a preset arrangement sequence.

The second processing unit 602 is specifically configured to acquire the first cosine values corresponding to the first M/2 angle index information from the M angle index information based on the M angle index information and the corresponding first cosine values, and construct the angle mapping table by use of the first M/2 angle index information and the corresponding first cosine values.

In some embodiments of the disclosure, the first cosine values corresponding to the M angle index information are cyclically distributed based on a preset arrangement sequence.

The second processing unit 602 is specifically configured to acquire the first cosine values corresponding to the first M/4+1 angle index information from the M angle index information based on the M angle index information and the corresponding first cosine values, and construct the angle mapping table by use of the first M/4+1 angle index information and the corresponding first cosine values.

In some embodiments of the disclosure, the second processing unit 602 is specifically configured to calculate the first cosine value and first sine value corresponding to the angle index information by use of a preset calculation strategy based on the angle index information of the current block. First cosine values and first sine values calculated based on different angle index information being not all even numbers.

In some embodiments of the disclosure, the GPM parameter of the current block includes size information and angle index information of the current block.

The second processing unit 602 is specifically configured to determine position information of a center sample of each SB in the current block based on the size information of the current block, determine a first cosine value and first sine value corresponding to the angle index information by use of a preset determination strategy based on the angle index information of the current block, first cosine values and first sine values corresponding to different angle index information being not all even numbers, and determine a weight value of the center sample of the SB in the current block based on the first cosine value and the first sine value in combination with the position information of the center sample of the SB in the current block respectively.

The second processing unit 602 is further configured to determine the weight index of the center sample of the SB in the current block as a motion index of the SB in the current block, and determine a storage type of motion information of the SB in the current block based on motion index information of the SB in the current block. The storage type includes storage of unidirectional motion information or storage of bidirectional motion information.

Figure 18:
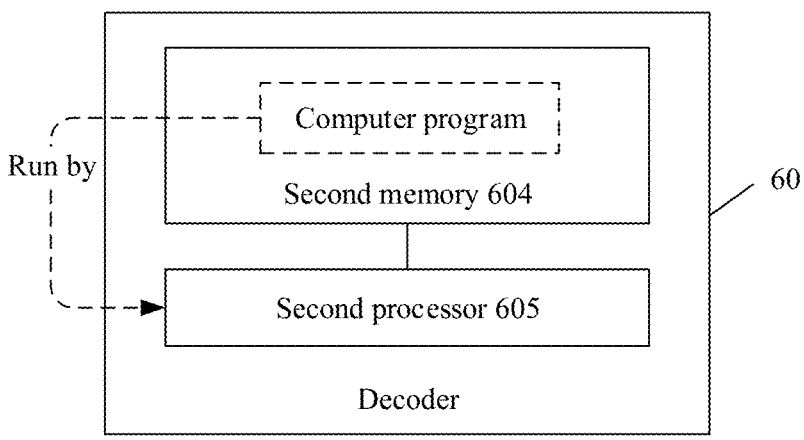
FIG. 18 is a second composition structure diagram of a decoder according to an embodiment of the disclosure.

In practical applications, the embodiments of the disclosure also provide a decoder. FIG. 18 is a second composition structure diagram of a decoder according to an embodiment of the disclosure. As shown in FIG. 18, the decoder 60 includes a second memory 604 and a second processor 605.

The second memory 604 stores a computer program capable of running in the second processor 605. The second processor 605 executes the program to implement the inter prediction method at a decoder side.

It can be understood that, when the decoder calculates weight indexes of samples during inter prediction, a power reduction process may be performed by use of a preset calculation strategy during the calculation of the weight indexes, so that the obtained weight indexes are not all even numbers. Therefore, on the basis of not changing the coding/decoding performance, the problem in the existing solution that intermediate index data includes redundant bits is solved, the bit overhead may be reduced, and the storage efficiency may be improved.

In addition, each function module in the embodiment may be integrated into a processing unit. Alternatively, each unit may physically exist independently. Alternatively, two or more than two units may be integrated into a unit. The integrated unit may be implemented in a hardware form, or in form of a software function module.

Correspondingly, the embodiments of the disclosure provide a storage medium, which stores a computer program. The computer program, when executed by a first processor implements the inter prediction method for an encoder.

Alternatively, the computer program is executed by a second processor to implement the inter prediction method for a decoder.

It is to be pointed out here that the above descriptions about the storage medium and device embodiments are similar to those about the method embodiments and beneficial effects similar to those of the method embodiments are achieved. Technical details undisclosed in the storage medium and device embodiments of the disclosure are understood with reference to the descriptions about the method embodiments of the disclosure.

The above is only the implementation mode of the disclosure and not intended to limit the scope of protection of the disclosure. Any variations or replacements apparent to those skilled in the art within the technical scope disclosed in the disclosure shall fall within the scope of protection of the disclosure. Therefore, the scope of protection of the disclosure shall be subject to the scope of protection of the claims.

In the embodiments of the disclosure, a prediction mode parameter of a current block is determined. A GPM parameter of the current block is determined in response to that the prediction mode parameter indicates that a GPM is used to determine an inter prediction value of the current block. A first prediction value of a first partition of the current block and a second prediction value of a second partition of the current block are determined based on the GPM parameter of the current block. A weight index of each sample in the current block is determined based on the GPM parameter of the current block, weight indexes of the samples determined based on different GPM parameters being not all even numbers. A first weight value and second weight value of the sample in the current block are determined based on the weight index of the sample in the current block. Weighted merging is performed, based on a first prediction value and first weight value of each sample in the first partition and a second prediction value and second weight value of each sample in the second partition, on the first prediction values and the second prediction values to obtain the inter prediction value of the current block. In this way, when weight indexes of samples are calculated, a power reduction process is performed by use of a preset calculation strategy during the calculation of the weight indexes, so that the obtained weight indexes are not all even numbers. Therefore, on the basis of not changing the coding/decoding performance, the weight index bit overhead may be reduced, and the storage efficiency may be improved.

The invention claimed is:

1. An inter prediction method, performed by an encoder and comprising:

determining a prediction mode parameter of a current block;

determining a Geometrical partition Mode (GPM) parameter of the current block in response to that the prediction mode parameter indicates that a GPM is used to determine inter prediction of the current block, the GPM parameter of the current block comprising size information and angle index information of the current block;

determining a first prediction value of a first partition of the current block and a second prediction value of a second partition of the current block based on the GPM parameter of the current block;

determining a weight index of a sample in the current block based on the GPM parameter of the current block, weight indices of samples determined based on different GPM parameters being not all even numbers;

determining a first weight value and a second weight value of the sample in the current block based on the weight index of the sample in the current block; and performing, based on a first prediction value and first weight value of a sample in the first partition and a second prediction value and second weight value of a sample in the second partition, weighted combination of the first prediction value and the second prediction value to obtain the inter prediction of the current block;

wherein determining the weight index of the sample in the current block based on the GPM parameter of the current block comprises:

determining position information of the sample in the current block based on the size information of the current block;

determining a first cosine value and a first sine value corresponding to the angle index information by constructing an angle mapping table or use of a preset determination strategy based on the angle index information of the current block, first cosine values and first sine values corresponding to different angle index information being not all even numbers; and determining the weight index of the sample in the current block based on the first cosine value and the first sine value in combination with the position information of the sample in the current block respectively.

2. The method of claim 1, wherein determining the first cosine value and the first sine value corresponding to the angle index information by use of the preset determination strategy based on the angle index information of the current block comprises:

determining cosine angle index information and sine angle index information of the current block based on the angle index information of the current block;

acquiring the first cosine value from a preset angle mapping table based on the cosine angle index information; and acquiring the first sine value from the preset angle mapping table based on the sine angle index information, wherein first cosine values and first sine values corresponding to different angle index information in the angle mapping table are not all even numbers.

3. The method of claim 2, before acquiring the first cosine value from the preset angle mapping table based on the cosine angle index information, further comprising:

obtaining second cosine values corresponding to M angle index information based on the M angle index information, M being an even number;

performing a power reduction process on the second cosine values corresponding to the M angle index information to obtain first cosine values corresponding to the M angle index information; and constructing the angle mapping table by use of the M angle index information and the corresponding first cosine values.

4. The method of claim 3, wherein the first cosine values corresponding to the M angle index information are cyclically distributed based on a preset arrangement sequence; and constructing the angle mapping table by use of the M angle index information and the corresponding first cosine values comprises:

acquiring first cosine values corresponding to the first M/2 angle index information based on the M angle index information and the corresponding first cosine values; and constructing the angle mapping table by use of the first M/2 angle index information and the corresponding first cosine values.

5. The method of claim 3, wherein the first cosine values corresponding to the M angle index information are cyclically distributed based on a preset arrangement sequence; and
constructing the angle mapping table by use of the M angle index information and the corresponding first cosine values comprises:
acquiring first cosine values corresponding to the first M/4+1 angle index information based on the M angle index information and the corresponding first cosine values; and
constructing the angle mapping table by use of the first M/4+1 angle index information and the corresponding first cosine values.

6. The method of claim 1, wherein determining the first cosine value and the first sine value corresponding to the angle index information by use of the preset determination strategy based on the angle index information of the current block comprises:
calculating the first cosine value and the first sine value corresponding to the angle index information by use of a preset calculation strategy based on the angle index information of the current block, first cosine values and second cosine values calculated based on different angle index information being not all even numbers.

7. The method of claim 1, wherein
determining the weight index of the sample in the current block based on the GPM parameter of the current block further comprises:
determining position information of a center sample of a Subblock (SB) in the current block based on the size information of the current block;
determining a first cosine value and a first sine value corresponding to the angle index information by use of the preset determination strategy based on the angle index information of the current block; and
determining a weight value of the center sample of the SB in the current block based on the first cosine value and the first sine value in combination with the position information of the center sample of the SB in the current block respectively.

8. The method of claim 7, further comprising:
determining the weight index of the center sample of the SB in the current block as a motion index of the SB in the current block; and
determining a storage type of motion information of the SB in the current block based on motion index information of the SB in the current block, wherein the storage type comprises storage of unidirectional motion information or storage of bidirectional motion information.

9. The method of claim 1, further comprising:
writing the angle index information of the current block into a bitstream.

10. An inter prediction method, performed by a decoder and comprising:
parsing a bitstream to determine a prediction mode parameter of a current block;
determining a Geometrical Partition Mode (GPM) parameter of the current block in response to that the prediction mode parameter indicates that a GPM is used to determine inter prediction of the current block, the GPM parameter of the current block comprising size information and angle index information of the current block;
determining a first prediction value of a first partition of the current block and a second prediction value of a second partition of the current block based on the GPM parameter of the current block;
determining a weight index of a sample in the current block based on the GPM parameter of the current block, weight indices of samples determined based on different GPM parameters being not all even numbers;
determining a first weight value and a second weight value of the sample in the current block based on the weight index of the sample in the current block; and
performing, based on a first prediction value and first weight value of a sample in the first partition and a second prediction value and second weight value of a sample in the second partition, weighted combination of the first prediction value and the second prediction value to obtain the inter prediction of the current block;
wherein determining the weight index of the sample in the current block based on the GPM parameter of the current block comprises:
determining position information of the sample in the current block based on the size information of the current block;
determining a first cosine value and a first sine value corresponding to the angle index information by constructing an angle mapping table or use of a preset determination strategy based on the angle index information of the current block, first cosine values and first sine values corresponding to different angle index information being not all even numbers; and
determining the weight index of the sample in the current block based on the first cosine value and the first sine value in combination with the position information of the sample in the current block respectively.

11. The method of claim 10, wherein determining the first cosine value and the first sine value corresponding to the angle index information by use of the preset determination strategy based on the angle index information of the current block comprises:
determining cosine angle index information and sine angle index information of the current block based on the angle index information of the current block;
acquiring the first cosine value from a preset angle mapping table based on the cosine angle index information; and
acquiring the first sine value from the preset angle mapping table based on the sine angle index information,
wherein first cosine values and first sine values corresponding to different angle index information in the angle mapping table are not all even numbers.

12. The method of claim 11, before acquiring the first cosine value from the preset angle mapping table based on the cosine angle index information, further comprising:
obtaining second cosine values corresponding to M angle index information based on the M angle index information, M being an even number;
performing a power reduction process on the second cosine values corresponding to the M angle index information to obtain first cosine values corresponding to the M angle index information; and
constructing the angle mapping table by use of the M angle index information and the corresponding first cosine values.

13. The method of claim 12, wherein the first cosine values corresponding to the M angle index information are cyclically distributed based on a preset arrangement sequence; and
    constructing the angle mapping table by use of the M angle index information and the corresponding first cosine values comprises:
    acquiring first cosine values corresponding to the first M/2 angle index information based on the M angle index information and the corresponding first cosine values; and
    constructing the angle mapping table by use of the first M/2 angle index information and the corresponding first cosine values.

14. The method of claim 12, wherein the first cosine values corresponding to the M angle index information are cyclically distributed based on a preset arrangement sequence; and
    constructing the angle mapping table by use of the M angle index information and the corresponding first cosine values comprises:
    acquiring first cosine values corresponding to the first M/4+1 angle index information based on the M angle index information and the corresponding first cosine values; and
    constructing the angle mapping table by use of the first M/4+1 angle index information and the corresponding first cosine values.

15. The method of claim 10, wherein determining the first cosine value and the first sine value corresponding to the angle index information by use of the preset determination strategy based on the angle index information of the current block comprises:
    calculating the first cosine value and the first sine value corresponding to the angle index information by use of a preset calculation strategy based on the angle index information of the current block, first cosine values and second cosine values calculated based on different angle index information being not all even numbers.

16. The method of claim 10, wherein
determining the weight index of the sample in the current block based on the GPM parameter of the current block further comprises:
    determining position information of a center sample of a Subblock (SB) in the current block based on the size information of the current block;
    determining a first cosine value and a first sine value corresponding to the angle index information by use of the preset determination strategy based on the angle index information of the current block; and
    determining a weight value of the center sample of the SB in the current block based on the first cosine value and the first sine value in combination with the position information of the center sample of the SB in the current block respectively.

17. The method of claim 16, further comprising:
    determining the weight index of the center sample of the SB in the current block as a motion index of the SB in the current block; and
    determining a storage type of motion information of the SB in the current block based on motion index information of the SB in the current block, wherein the storage type comprises storage of unidirectional motion information or storage of bidirectional motion information.

18. An encoder, comprising:
a first memory and a first processor, wherein
the first memory stores a computer program capable of running in the first processor; and
the first processor executes the program to implement an inter prediction method, comprising:
    determining a prediction mode parameter of a current block;
    determining a Geometrical partition Mode (GPM) parameter of the current block in response to that the prediction mode parameter indicates that a GPM is used to determine inter prediction of the current block, the GPM parameter of the current block comprising size information and angle index information of the current block;
    determining a first prediction value of a first partition of the current block and a second prediction value of a second partition of the current block based on the GPM parameter of the current block;
    determining a weight index of a sample in the current block based on the GPM parameter of the current block, weight indices of samples determined based on different GPM parameters being not all even numbers;
    determining a first weight value and a second weight value of the sample in the current block based on the weight index of the sample in the current block; and
    performing, based on a first prediction value and first weight value of a sample in the first partition and a second prediction value and second weight value of a sample in the second partition, weighted combination of the first prediction value and the second prediction value to obtain the inter prediction of the current block;
wherein the first processor executes the program to:
    determine position information of the sample in the current block based on the size information of the current block;
    determine a first cosine value and a first sine value corresponding to the angle index information by constructing an angle mapping table or use of a preset determination strategy based on the angle index information of the current block, first cosine values and first sine values corresponding to different angle index information being not all even numbers; and
    determine the weight index of the sample in the current block based on the first cosine value and the first sine value in combination with the position information of the sample in the current block respectively.

* * * * *